(12) United States Patent
Roesch et al.

(10) Patent No.: US 12,314,654 B1
(45) Date of Patent: May 27, 2025

(54) SYSTEM AND METHOD FOR ELECTROMAGNETIC MODELING IN AN ELECTRONIC CIRCUIT DESIGN

(71) Applicant: Cadence Design Systems, Inc., San Jose, CA (US)

(72) Inventors: Claudia Roesch, Memmingen (DE); Balvinder Singh, Haryana (IN); Murray Glen Shattuck, Jr., Erie, CO (US); Michael Thompson, Upland, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 393 days.

(21) Appl. No.: 17/737,449

(22) Filed: May 5, 2022

(51) Int. Cl.
*G06F 30/398* (2020.01)
*G06F 30/367* (2020.01)
*G06F 30/392* (2020.01)
*G06F 119/02* (2020.01)

(52) U.S. Cl.
CPC .......... *G06F 30/398* (2020.01); *G06F 30/367* (2020.01); *G06F 30/392* (2020.01); *G06F 2119/02* (2020.01)

(58) Field of Classification Search
CPC ........................................ G06F 30/398
USPC .......................................... 716/115
See application file for complete search history.

(56) References Cited

U.S. PATENT DOCUMENTS

| 8,091,052 B2* | 1/2012 | Rewienski | G06F 30/367 716/111 |
| 2011/0173582 A1* | 7/2011 | Bhattacharya | G06F 30/367 706/47 |
| 2015/0186591 A1* | 7/2015 | Gurney | G06F 30/398 716/116 |

* cited by examiner

*Primary Examiner* — Eric D Lee
(74) *Attorney, Agent, or Firm* — Mark H. Whittenberger; Holland & Knight LLP

(57) ABSTRACT

Embodiments include herein are directed towards a method for use in an electronic design environment is provided. Embodiments may include receiving, using at least one processor, an electronic design layout and performing parasitic extraction on the electronic design layout. Embodiments may further include extracting an electromagnetic model from the electronic design layout and reconnecting at least one coupling capacitor associated with a net of the electromagnetic model. Embodiments may include performing a simulation including the reconnected at least one coupling capacitor.

10 Claims, 37 Drawing Sheets

QUANTUS SMARTVIEW

TO FIG. 16 CONT.

* Instance section
* *
// Library name: EMX_Quantus_coupling_cap
// Cell name: tcl_flipped
// View name: flipped_RCcoupled
// View type: maskLayout R0 net_top#3 in_top#2 resm1_pcell_0 segL=8e-06 segW=2e-06 dtemp=0
+ $x=14.535 $y=-11
R2 net_bottom#3 in_bot#2 resm1_pcell_0 segL=8e-06 segW=2e-06 dtemp=0
+ $x=14.535 $y=-8
R1 out_top#2 net_top#2 resm1_pcell_0 segL=8e-06 segW=2e-06 dtemp=0
+ $x=-44.305 $y=-11
R3 out_bot#2 net_bottom#2 resm1_pcell_0 segL=8e-06 segW=2e-06 dtemp=0
+ $x=-44.305 $y=-8
.ends tcl_flipped

*FIG. 16*

| FIG. 16 | FIG. 16 CONT. 1 |

AFTER EM STITCHING

```
// library name: EMX_Quantus_coupling_cap
// cell name: tc1_flipped
// view name: flipped_RCcoupled_sparam
// View type: masklayout R0 net_top in_top#2 resm1_pcell_0 segL=8e-06 segW=2e-06 dtemp=0+ $x=14.535
+ $y=-11

R2 net_bottom#3 in_bot#2 resm1_pcell_0 segL=8e-06 sewgW=2e-06 dtemp=0
+ $x=14.535 $y=-8

R1 out_top2 INTERNAL_net_top_MI1_1 resm1_pcell_0 segL=8e-06 segW=2e-06
+ dtemp=0 $x=44.305 $y=-11

R3 out_bot#2 net_bottom#2 resm1_pcell_0 segL=8e-06 dtemp=0
+ $x=44.305 $y=-8
MI1 ( net_top gnd! INTERNAL_net_top_MI1_1 gnd!) nport
+ file=1/sprt/workspace/croesch/PE/coupling_cap/new/EMX_Quantus_PV/oadb/EMX_Quantus_coupling_cap/tc1_flipped/flipp
+ $x=13.326 $y=-14.725
ends tc1_flipped
```

FROM FIG. 16

New instance MI1
- '95 instance of nport
- '95 s-param extracted by EMX
- '95 connects to R0 via net_top
- '95 connects to R1 via INTERNAL_net_top_MI1

*FIG. 16 (CONT. 1)*

| FIG. 16 | FIG. 16 CONT. 1 |

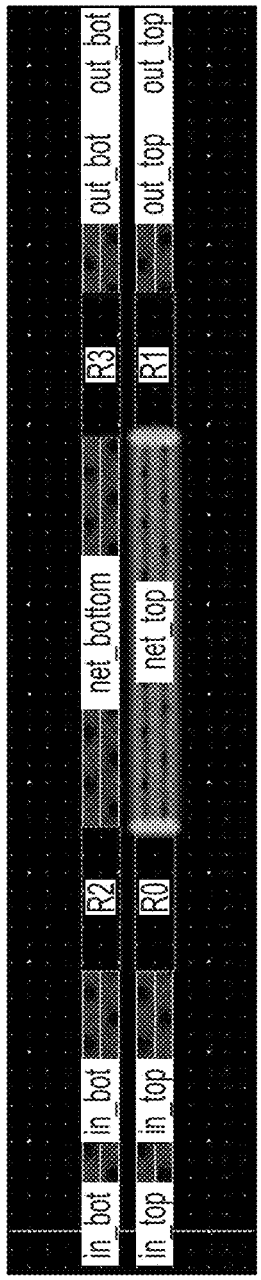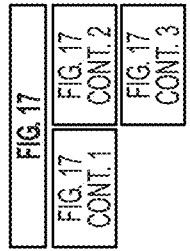
FIG. 17

```
* flipped_RCcoupled.dspf
*|NET gnd! 2.00495e-14
*|P (gnd! X 0 0.490000 0.505000) // $llx=0.490000 0.505000 $urx=0.490000 $ury0.505000

*|NET net_top 3.9892e-15
*|S (NET_top#1 22.535500 -12.000000) // $llx=22.535500 -12.000000 $urx=22.535500 $ury=-12.000000
*|I (NET_top#2 R1 plus X O 44.304500 -12.000000) // $llx=44.304500 $lly=-12.000000 $urx=44.304500 $ury=-1
*|I (NET_top#3 R0 minus X O 22.535500 -12.000000) // $llx=22.535500 $lly=-12.000000 $urx=22.535400 $ury=-
*|S (NET_top#4 40.676000 -12.000000) // $llx=40.676000 $lly=-12.000000 $urx=40.676000 $ury=-12.000000
*|S (NET_top#5 37.048000 -12.000000) // $llx=37.048000 $lly=-12.000000 $urx=37.048000 $ury=-12.000000
*|S (NET_top#6 33.420000 -12.000000) // $llx=33.420000 $lly=-12.000000 $urx=33.420000 $ury=-12.000000
*|S (NET_top#7 29.792000 -12.000000) // $llx=29.792000 $lly=-12.000000 $urx=29.792000 $ury=-12.000000
*|S (NET_top#8 26.164000 -12.000000) // $llx=26.164000 $lly=-12.000000 $urx=26.164000 $ury=-12.000000
c_30 net_top#4 gnd! 2.82384e-16 $x=39.7585 $y=-11.9925
c_31 net_top#5 gnd! 5.64924e-16 $x=37.03 $y=-11.985
c_32 net_top#6 gnd! 5.64924e-16 $x=33.4065 $y=-11.985
c_33 net_top#7 gnd! 5.64924e-16 $x=29.783 $y=-11.985
c_34 net_top#1 gnd! 1.47072e-15 $x=23.253 $y=-11.9615
c_35 net_top#1 net_bottom#3 2.30906e- $x=23.2565 $y=-10.5005
c_36 net_top#5 net_bottom#4 8.86942e- $x=37.0485 $y=-10.5005
c_37 net_top#6 net_bottom#5 8.86942e- $x=33.4205 $y=-10.5005
c_38 net_top#7 net_bottom#6 8.86942e- $x=29.7925 $y=-10.5005
c_39 net_top#4 net_bottom#7 4.43349e- $x=39.7695 $y=-10.5005
r_6_2052 net_top#2 net_top#4 0.123174 $metal1_conn
r_6_3073 net_top#3 net_top#1 0.001 $nwires
r_6_4101 net_top#4 net_top#5 0.123157 $metal1_conn
r_6_5126 net_top#5 net_top#6 0.123157 $metal1_conn
r_6_6151 net_top#6 net_top#7 0.123157 $metal1_conn
r_6_7176 net_top#7 net_top#8 0.123157 $metal1_conn
r_6_8193 net_top#8 net_top#1 0.123174 $metal1_conn

*|NET net_bottom 5.36374e-15
*|S (net_bottom#1 36.164000 8.000000) // $x=36.164000 $y=-8.000000 $urx=36.164000 $ury-8.000000
```

*FIG. 17*

| FIG. 17 |
| FIG. 17 CONT. 1 | FIG. 17 CONT. 2 |
| | FIG. 17 CONT. 3 |

```
O flipped_RCcoupled_sparam.dspf
*|S (out_bot#5 55.619000 -9.000000) // $llx=55.619000 $lly=-9.000000 $urx=55.619000 $ury=-9.000000
c_1 out_bot#2 gnd! 1.39281e-15 $x=52.697 $y=-8.9725
c_2 out_bot#3 gnd! 5.12907e-16 $x=62.2 $y=-8.99
c_3 out_bot#4 gnd! 5.12907e-16 $x=58.891 $y=-8.99
c_4 out_bot gnd! 4.10767e-16 $x=64.93 $y=8.9935
c_5 out_bot#2 out_top#2 1.9898e-16 $x=52.774 $y=9.5625
c_6 out_bot#4 out_top#2 6.74148e-17 $x=58.392 $y=-9.2385
c_7 out_bot out_top 4.95805e-17 $x=64.961 $y=-10.672
c_8 out_bot#3 out_top#3 6.74148e-17 $x=61.5855 $y=-10.1905
r_1 1027 out_bot out_bot#3 0.112464 $metal1_conn
r_1 3076 out_bot#3 out_bot#4 0.112464 $metal1_conn
r_1 4101 out_bot#4 out_bot#5 0.112464 $metal1_conn
r_1 5122 out_bot#2 0.112481 $metal1_conn

*|NET gnd! 2.08435e-14
*|P (gnd! X 0 0.049000 0.505000) // $llx=0.490000 0.505000 $urx=0.490000 $ury=0.505000
c_35 gnd! net_bottom#3 2.30906e-16 $x=23.2565 $y=-10.5005
c_36 gnd! net_bottom#4 8.86942e-17 $x=37.0485 $y=-10.5005
c_37 gnd! net_bottom#5 8.86942e-17 $x=33.4205 $y=-10.5005
c_38 gnd! net_bottom#6 8.86942e-17 $x=29.7925 $y=-10.5005
c_39 gnd! net_bottom#7 4.43349e-17 $x=39.7695 $y=-10.5005

*|NET net_bottom 5.36374e-15
*|S (net_bottom#3 126.164000 -9.000000) // $llx=26.164000 $lly=-9.000000 $urx=26.164000 $ury=-9.000000
*|I (net_bottom#2 R3 plus X 0 44.304500 -9.000000) // $llx=44.304500 -9.000000 $urx=44.304500 $ury=-9.000000
*|I (net_bottom#3 R2 minus X 0 22.535500 -9.000000) // $llx=22.535500 -9.000000 $urx=22.535500 $ury=-9.000000
*|S (net_bottom#4 37.048000 -9.000000) // $llx=37.048000 $lly=-9.000000 $urx=37.048000 $ury=-9.000000
*|S (net_bottom#5 33.420000 -9.000000) // $llx=33.420000 $lly=-9.000000 $urx=33.420000 $ury=-9.000000
*|S (net_bottom#6 29.792000 -9.000000) // $llx=29.792000 $lly=-9.000000 $urx=29.792000 $ury=-9.000000
*|S (net_bottom#7 40.676000 -9.000000) // $llx=40.676000 $lly=-9.000000 $urx=40.676000 $ury=-9.000000
c 40 net_bottom#3 gnd! 1.47072e-15 $x=23.253 $y=-8.971
```

FROM 17 CONT. 1

NET SECTION OF DSPF-NETLIST

- '95 NET_TOP REPLACED BY MI1 (PARASITIC RES REMOVED)
- '95 COUPLING-CAPS BETWEEN NET_TOP AND NET_BOTTOM CONNECTED TO GND (C_35 TO C_39)

*FIG. 17 CONT. 3*

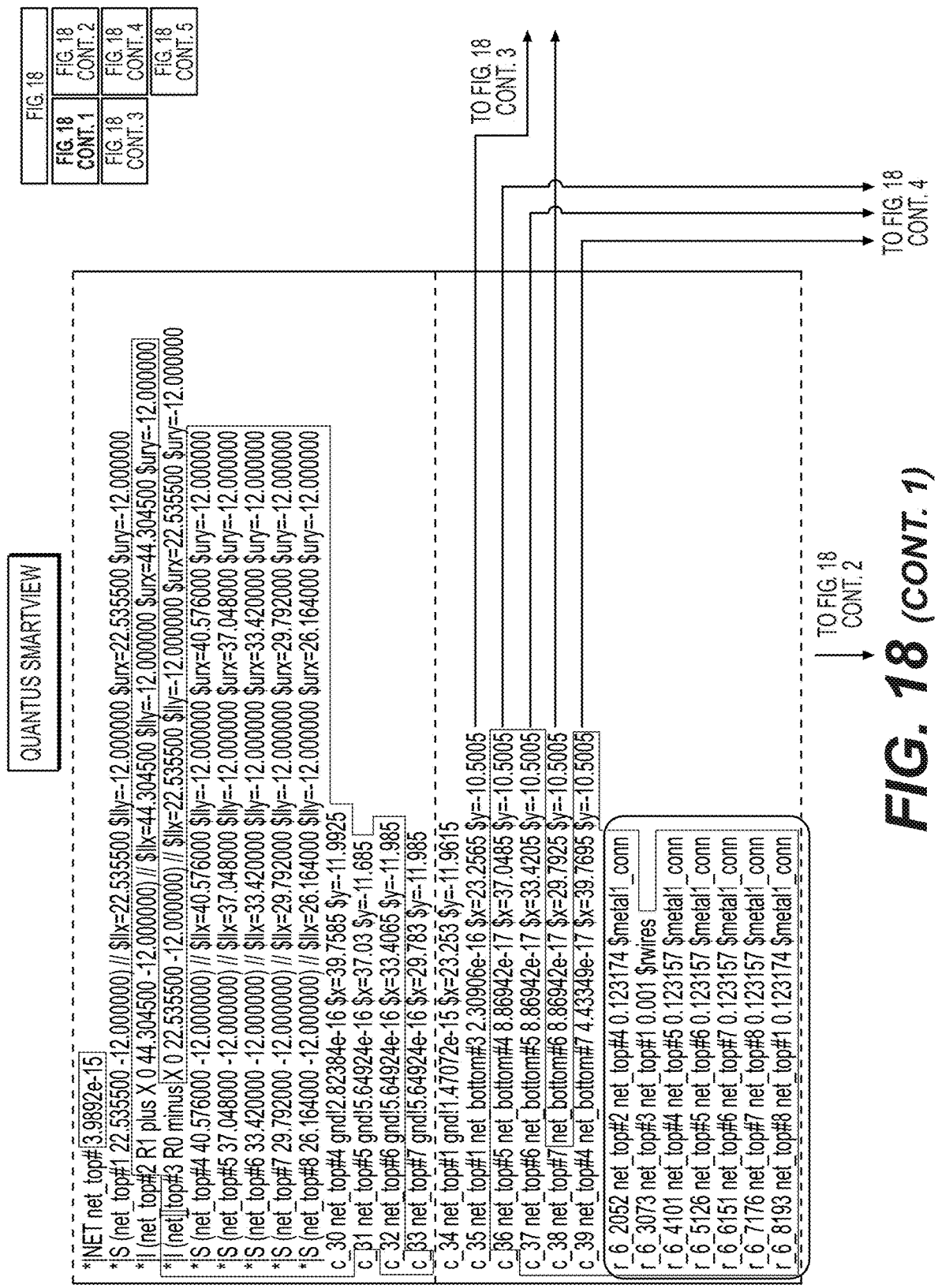
FIG. 18 (CONT. 1)

| FIG. 18 | FIG. 18 CONT. 2 | FIG. 18 CONT. 4 |
|---|---|---|
| FIG. 18 CONT. 1 | FIG. 18 CONT. 3 | FIG. 18 CONT. 5 |

QUANTUS SMARTVIEW

FROM FIG. 18 CONT. 1 →

```
*|NET net_bottom 5.36374e-15
*|S (net_bottom#1 26.164000 -9.000000) // $llx=26.164000 $lly=-9.000000 $urx=26.164000 $ury=-9.000000
*|I (net_bottom#2 R3 plus X 0 44.304500 -9.000000) // $llx=44.304500 $lly=-9.000000 $urx=44.304500 $ury=-9.000000
*|I (net_bottom#3 R2 minus X 0 22.535500 -9.000000) // $llx=22.535500 $lly=-9.000000 $urx=22.535500 $ury=-9.000000
*|S (net_bottom#4 37.048000 -9.000000) // $llx=37.048000 $lly=-9.000000 $urx=37.048000 $ury=-9.000000
*|S (net_bottom#5 33.420000 -9.000000) // $llx=33.420000 $lly=-9.000000 $urx=33.420000 $ury=-9.000000
*|S (net_bottom#6 29.792000 -9.000000) // $llx=29.792000 $lly=-9.000000 $urx=29.792000 $ury=-9.000000
*|S (net_bottom#7 40.676000 -9.000000) // $llx=40.676000 $lly=-9.000000 $urx=40.676000 $ury=-9.000000
c_40 net_bottom#3gnd! 1.47072e-15 $x=23.253 $y=-8.971
c_41 net_bottom#2gnd! 1.18802e-15 $x=44.4325 $y=-8.9765
c_42 net_bottom#7gnd! 2.82384e-16 $x=39.7585 $y=-8.9945
c_43 net_bottom#4gnd! 5.64924e-16 $x=37.03 $y=-8.989
c_44 net_bottom#5gnd! 5.64924e-16 $x=33.4065 $y=-8.989
c_45 net_bottom#6gnd! 5.64924e-16 $x=29.783 $y=-8.989
r_7 1027 net_bottom#3 0.123174 $net_bottom#1 net_bottom#3 0.123174 $metal1_conn
r_7 2055 net_bottom#2 net_bottom#7 0.123174 $metal1_conn
r_7 4101 net_bottom#4 net_bottom#5 0.123157 $metal1_conn
r_7 5126 net_bottom#5 net_bottom#6 0.123157 $metal1_conn
r_7 6145 net_bottom#6 net_bottom#1 0.123157 $metal1_conn
r_7 7172 net_bottom#7 net_bottom#4 0.123157 $metal1_conn
*
*
*Instance section
```

FIG. 18 (CONT. 2)

| FIG. 18 | | |
|---|---|---|
| FIG. 18 CONT. 1 | FIG. 18 CONT. 2 | |
| FIG. 18 CONT. 3 | FIG. 18 CONT. 4 | |
| | FIG. 18 CONT. 5 | |

AFTER EM STITCHING

```
c_5 out_bot#2 out_top#2 1.9898e-16 $x=52.774 $y=-9.5625
c_6 out_bot#4 out_top#4 6.74148e-17 $x=58.392 $y=-9.2385
c_7 out_bot out_top 4.95805e-17 $x+64.961 $y=-10.672
c_8 out_bot#3 out_top#3 6.74148e-17 $x=61.5855 $y=-10.1905
r_1_1027 out_bot out_bot#3 0.112464 $metall_conn
r_1_3076 out_bot#3 out_bot#4 0.112464 $metall_conn
r_1_4101 out_bot#4 out_bot#5 0.112464 $metall_conn
r_1_5122 out_bot#5 out_bot#2 0.112481 $metall_conn

*|NET gnd! 2.08435e-14
*|P (gnd! x 0 0.490000 0.505000) // $llx=0.490000 $lly=0.505000 $urx=0.490000 $ury=0.505000

*|NET net_top[0]
*|I (net_top#1|R0 minus x 0] 22.535500 -12.000000) // $llx=22.535500 $lly=-12.000000 $urx=22.535500 $ury=-12.000000
*|I (net_top#1|m!1 r0] minus x 0 22.535500 -12.000000) // $llx=22.535500 $lly=-12.000000 $urx=22.535500 $ury=-12.000000
c_33 net_top#1 gnd! 5.64924e-16 $x=29.783 $y=-11.985
c_34 net_top#1 gnd! 1.47072e-15 $x=23.253 $y=-11.9615
c_35 net_top#1 net_bottom#3 2.30906e-16 $x=23.2565 $y=-10.5005
c_38 net_top#1 net_bottom#6 8.86942e-17 $x=29.7925 $y=-10.5005

*|NET net_bottom 5.36374e-15
*|S (net_bottom#1 26.164000 -9.000000) // $llx=26.164000 $lly=-9.000000 $urx=26.164000 $ury=-9.000000
*|I (net_bottom#2 R3 plus x 0 44.304500 -9.000000) // $llx=44.304500 $lly=-9.000000 $urx=44.304500 $ury=-9.000000
```

FROM FIG. 18 CONT. 1

*FIG. 18 (CONT. 3)*

AFTER EM STITCHING

```
* |I (net_bottom#3 R2 minus x 0 22.535500 -9.000000) // $llx=22.535500 $lly=-9.000000 $urx=22.535500 $ ury=-9.000000
* |S (net_bottom#4 37.048000 -9.000000) // $llx=37.048000 $lly=-9.000000 $urx=37.048000 $ury=-9.000000
* |S (net_bottom#5 33.420000 -9.000000) // $llx=33.420000 $lly=-9.000000 $urx=33.420000 $ury=-9.000000
* |S (net_bottom#6 29.792000 -9.000000) // $llx=29.792000 $lly=-9.000000 $urx=29.792000 $ury=-9.000000
* |S (net_bottom#7 40.676000 -9.000000) // $llx=40.676000 $lly=-9.000000 $urx=40.676000 $ury=-9.000000
c_40 net_bottom#3 gnd! 1.47072e-15 $x=23.253 $y=-8.971
c_41 net_bottom#2 gnd! 1.18802e-15 $x=-44.4325 $y=-8.9765
c_42 net_bottom#7 gnd! 2.82384e-16 $x=39.7585 $y=-8.9465
c_43 net_bottom#4 gnd! 5.64924e-16 $x=37.03 $y=-8.989
c_44 net_bottom#5 gnd! 5.64924e-16 $x=33.4065 $y=-8.989
c_45 net_bottom#6 gnd! 5.64924e-16 $x=29.783 $y=-8.989
r_7_1027 net_bottom#1 0.123174 $metail_conn
r_7_2055 net_bottom#2 0.123174 $metail_conn
r_7_4101 net_bottom#4 0.123157 $metail_conn
r_7_5126 net_bottom#5 0.123157 $metail_conn
r_7_6145 net_bottom#6 0.123157 $metail_conn
r_7_7172 net_bottom#7 0.123157 $metail_conn

* |NET INTERNAL_net_top_MI1_10
* |I (INTERNAL_net_top_MI1#1 R1 plus X 0 44.304500 -12.000000) // $llx=44.304500 -12.000000 $lly=-12.000000 $urx=44.304500 $ury=-
* |I (INTERNAL_net_top_MI1 r1_plus X 0 44.304500 -12.000000) // $llx=44.304500 $lly=-12.000000 $urx=44.304500 $u
c_30 INTERNAL_net_top_MI1_1#1 gnd! 2.82384e-16 $ x=39.7585 $y=-11.9925
c_31 INTERNAL_net_top_MI1_1#1 gnd! 5.64924e-16 $x=37.03 $y=-11.985
c_32 INTERNAL_net_top_MI1_1#1 gnd! 5.64924e-16 $x=33.4065 $y=-11.985
c_36 INTERNAL_net_top_MI1_1#1 net_bottom#4 8.86942e-17 $x=37.0485 $y=-10.5005
c_37 INTERNAL_net_top_MI1_1#1 net_bottom#5 8.86942e-17 $x=33.4205 $y=-10.5005
c_39 INTERNAL_net_top_MI1_1#1 net_bottom#7 4.43349e-17 $x=39.7695 $y=-10.5005
```

*FIG. 18 (CONT. 4)*

NET SECTION OF dspf-netlist

- PARASITIC RESISTORS OF net_top REPLACED BY nport
- COUPLING-CAPS BETWEEN net_top
  AND net_bottom CONNECTED TO CLOSEST PORT
  EITHER net_top#1 CONNECTING TO R0 OR
  INTERNAL_net_top_MI1_1#1 CONNECTING TO R1

*FIG. 18 (CONT. 5)*

SYSTEM AND METHOD FOR ELECTROMAGNETIC MODELING IN AN ELECTRONIC CIRCUIT DESIGN

BACKGROUND

Design engineers may often desire to simulate an IC (integrated circuit) design within the context of a system design that spans across the IC design fabric, the package design fabric, and PCB (printed circuit board) design fabric. Today's PCBs are quite complicated running into many hundreds of pages and thousands of components with a mix of connectors, digital content and analog content and it is almost impossible to simulate such a circuit, particularly when trying to account for parasitic effects.

To accurately capture high frequency effects any RF critical parts of the electronic layout must be extracted using a three dimensional ("3D") electromagnetic solver. For the remaining, less RF critical parts of the design, parasitic extraction with existing tools is sufficiently accurate and saves extraction and simulation run time. These parasitic extraction tools model parasitic effects of physical structures in an RC netlist. Parasitic devices relate to metal shapes in the layout. In most cases a single layout net is cut in multiple parasitic resistors and the capacitive coupling between two nets is modeled in an resistor/capacitor ("RC") chain. Unlike a parasitic extraction tool, an electromagnetic ("EM") solver returns an s-parameter model (n-port).

SUMMARY

In one or more embodiments of the present disclosure, a computer-implemented method for use in an electronic design environment is provided. The method may include receiving, using at least one processor, an electronic design layout and performing parasitic extraction on the electronic design layout. The method may further include extracting an electromagnetic model from the electronic design layout and reconnecting at least one coupling capacitor associated with a net of the electromagnetic model. The method may include performing a simulation including the reconnected at least one coupling capacitor.

One or more of the following features may be included. In some embodiments, reconnecting at least one coupling capacitor may include reconnecting to a ground net, reconnecting to a closest port of the electromagnetic model, and/or reconnecting to an electromagnetic simulator network. Reconnecting to the electromagnetic simulator network may occur prior to solving for one or more s-parameters. Reconnecting to the closest port of the electromagnetic model may include pin to pin tracing for instances embedded in the electromagnetic model. The method may further include defining one or more trace through cells, automatically detecting the one or more trace through cells, and/or reconnecting a capacitance for one or more embedded nets that connect to the trace through cells. In some embodiments, reconnecting the capacitance may occur at the closest port.

In one or more embodiments of the present disclosure a computer-readable storage medium having stored thereon instructions, which when executed by a processor result in one or more operations is provided. Operations may include receiving, using at least one processor, an electronic design layout and performing parasitic extraction on the electronic design layout. Operations may further include extracting an electromagnetic model from the electronic design layout and reconnecting at least one coupling capacitor associated with a net of the electromagnetic model. Operations may include performing a simulation including the reconnected at least one coupling capacitor.

One or more of the following features may be included. In some embodiments, reconnecting at least one coupling capacitor may include reconnecting to a ground net, reconnecting to a closest port of the electromagnetic model, and/or reconnecting to an electromagnetic simulator network. Reconnecting to the electromagnetic simulator network may occur prior to solving for one or more s-parameters. Reconnecting to the closest port of the electromagnetic model may include pin to pin tracing for instances embedded in the electromagnetic model. Operations may further include defining one or more trace through cells, automatically detecting the one or more trace through cells, and/or reconnecting a capacitance for one or more embedded nets that connect to the trace through cells. In some embodiments, reconnecting the capacitance may occur at the closest port.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 16-18 illustrate graphical user interface examples showing output netlists consistent with embodiments of the present disclosure;

DETAILED DESCRIPTION

Parasitic extraction and electromagnetic techniques are required when circuits become electrically large and require physical structures to be considered as distributive rather than lumped structures. For low frequency parasitic effects of interconnects are captured using a parasitic extraction engine. The result is an RC network. At higher frequencies three dimensional EM full wave solvers may be used for better accuracy at the expense of longer run time. In larger, more complex RF designs both approaches may be combined to optimize the speed vs accuracy trade-off.

In some embodiments, a highly accurate electromagnetic simulator may be used for any RF critical part of the design, which may provide an EM model (e.g., an s-parameter file) as an output. A parasitic extraction tool may also be used for less RF critical parts of the design, which may provide an RC network as an output.

Embodiments included herein provide several options to handle the coupling capacitances at the interface between the EM model and RC network. Applicability of the different options depend on the design specifics and the required level of accuracy. Accordingly, embodiments included herein may allows the user (e.g., an RF designer) to select the best trade-off between speed vs accuracy depending on the design.

Various embodiments are directed to a method, system, and computer program product for parasitic extraction in an electronic design. In some embodiments, the present disclosure may allow for the extraction and reconnection of coupling capacitors for use in electronic design simulation. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of various embodiments, unless otherwise specifically described in particular embodiment(s) or recited in the claim(s). Where certain elements of embodiments may be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration. More details about various processes or modules to implement various embodiments are further described below with reference to FIGS. 1-25.

Figure 1A:
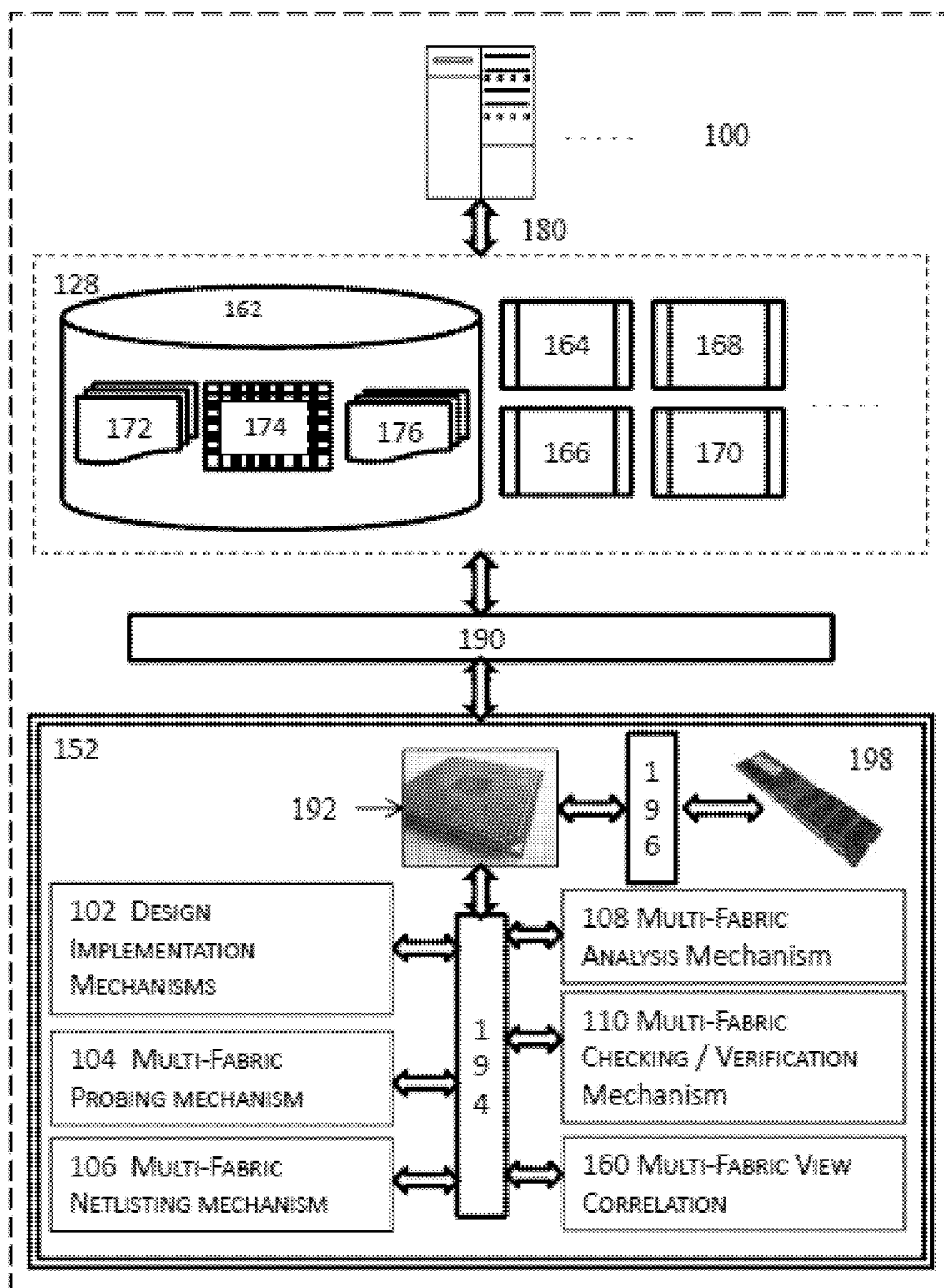
FIG. 1A illustrates a high level schematic block diagram for simulation in one or more embodiments.

FIG. 1A illustrates a high level schematic block diagrams for performing parasitic extraction in one or more embodiments. More specifically, FIG. 1A illustrates an illustrative high level schematic block diagrams for performing parasitic extraction and may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise a floorplanner, a global routing engine, and/or a detail routing engine 164, a layout editor 166, a design rule checker 168, a verification engine 170, etc.

The one or more computing systems 100 may further write to and read from a local or remote non-transitory computer accessible storage 162 that stores thereupon data or information such as, but not limited to, one or more databases (174) such as schematic design database(s) or physical design database(s), electronic circuit design specification database(s), various statistics, various data, rule decks, various design rules, constraints, etc. (172), or other information or data (176) that may be used to facilitate the performance of various functions to achieve the intended purposes.

In some embodiments, the one or more computing systems 100 may include or, either directly or indirectly through the various resources 128, invoke a set of mechanisms 152 including hardware mechanisms and software modules or combinations of one or more hardware mechanisms and one or more software modules that may comprises a plurality of design implementation modules 102 (e.g., schematic design tool, layout tool, etc.) to insert, remove, modify, improve, optimize, or otherwise operate upon designs in different fabrics (e.g., the die design fabric, the integrated circuit or IC packaging design fabric, the printed circuit board or PCB design fabric, the test bench design fabric, etc.), one or more multi-fabric probing modules 104 to probe multi-fabric designs across multiple design fabrics.

The set of mechanisms 152 may further optionally include one or more multi-fabric netlisting modules 106 to netlist multi-fabric designs across multiple design fabrics, one or more multi-fabric analysis modules 108 to simulate or analyze multi-fabric design across multiple design fabrics, one or more check or verification modules 110 to check or verify the correctness of multi-fabric designs across multiple design fabrics, and one or more multi-fabric view correlation modules 160 to correlate various symbolic views, schematic views, and/or layout views with the schematic design data or the layout data in different design fabrics at various hierarchical levels, etc.

In some embodiments, the computing system 100 may include the various resources 128 such that these various resources may be invoked from within the computing system via a computer bus 180 (e.g., a data bus interfacing a microprocessor 192 and the non-transitory computer accessible storage medium 198 or a system bus 190 between a microprocessor 192 and one or more engines in the various resources 128). In some other embodiments, some or all of these various resources may be located remotely from the computing system 100 such that the computing system may access the some or all of these resources via a computer bus 180 and one or more network components.

The computing system may also include one or more mechanisms in the set of mechanisms 152. One or more mechanisms in the set 152 may include or at least function in tandem with a microprocessor 192 via a computer bus 194 in some embodiments. In these embodiments, a single microprocessor 192 may be included in and thus shared among more than one mechanism even when the computing system 100 includes only one microprocessor 192. A microprocessor 192 may further access some non-transitory memory 198 (e.g., random access memory or RAM) via a system bus 196 to read and/or write data during the microprocessor's execution of processes.

Figure 1B:
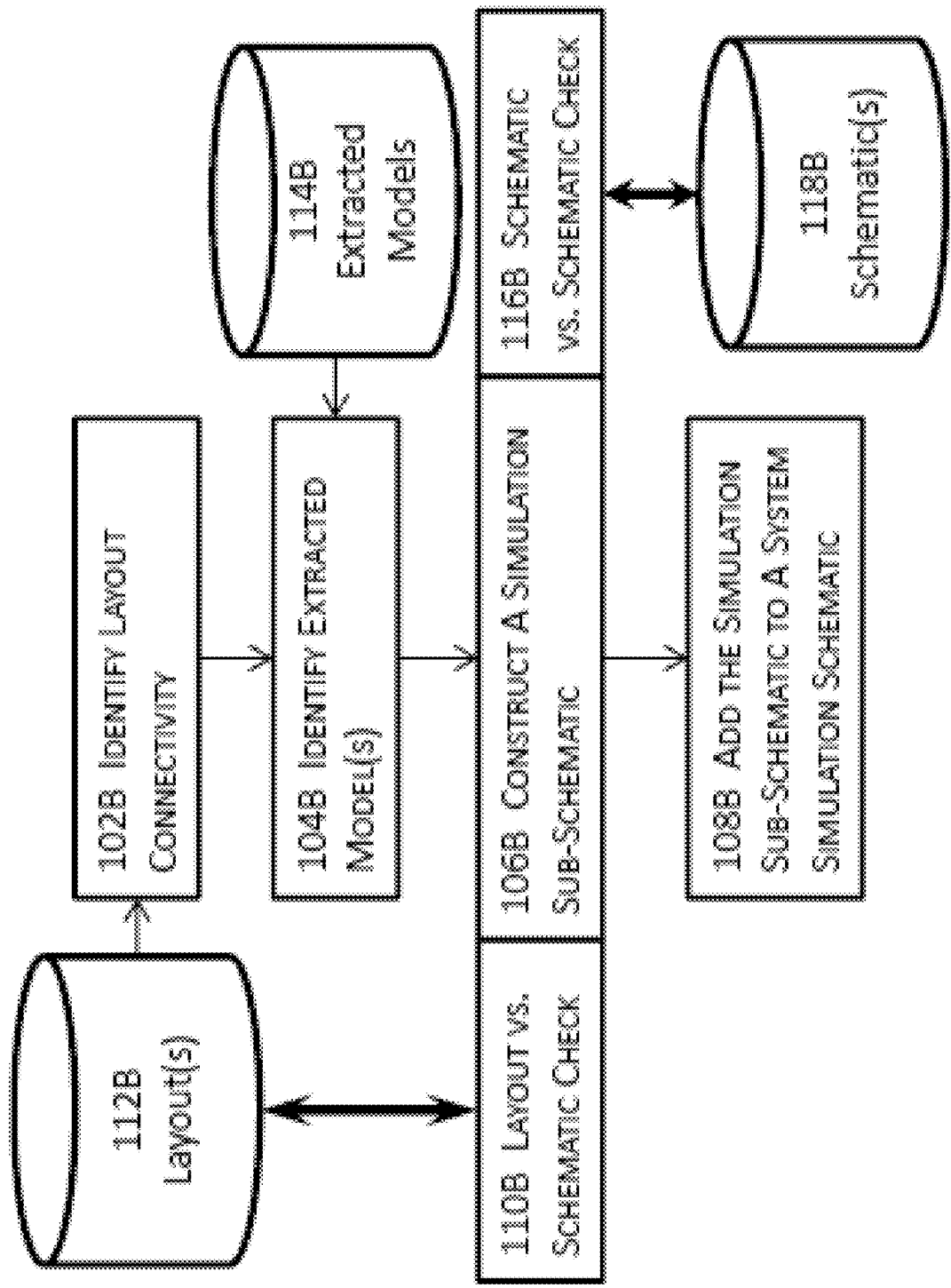
FIG. 1B illustrates another high level schematic block diagrams in one or more embodiments.

FIG. 1B illustrates another high level schematic block diagrams for performing parasitic extraction in one or more embodiments. In these embodiments, one or more layouts 112B may be identified from one or more non-transitory computer readable storage media or devices. These one or more layouts may include one or more integrated circuit (IC) layouts, one or more IC package layouts for the one or more IC layouts, and/or a printed circuit board (PCB) layout, etc.

Layout connectivity may be identified or extracted at 102B from these one or more layouts 112B, and the extracted layout connectivity may be used to interconnect various models in the simulation schematic. One or more extracted models may be identified at 104B from a list of extracted models 114B obtained from the same electronic design or one or more prior electronic designs.

It shall be noted that various schematics may or may not necessarily exist in these one or more embodiments illustrated in FIG. 1B. Existing schematic symbols or models may be leveraged such that extracted models need not be constructed every time they are needed in a simulation schematic. A schematic cellview symbol or model may be used directly as an extracted model in a simulation schematic in some embodiments or may be annotated, stitched, or associated with parasitic data to form an extracted model in some other embodiments.

In some embodiments where one or more schematic designs (e.g., the schematic of a PCB design, the schematic of an IC package, the schematic of an IC design, etc.) do exist, the schematic models or cellview symbols for circuit component designs in a plurality of design fabrics may thus be extracted from the respective schematic designs and imported as the extracted models into the simulation schematic. In some embodiments, a schematic cellview symbol or model may further be annotated or stitched with parasitic data and stored as an extracted model in a central repository.

These one or more schematic designs may or may not necessarily be in a format that is compatible or recognizable by the native editor of a simulation schematic. Schematic cellview symbols or models from these one or more schematic designs may be imported as extracted models into a simulation schematic via transformation in some embodiments or may be constructed anew and stored in a central repository in some other embodiments.

In some other embodiments where the schematic designs are unavailable or incomplete such that some circuit component designs extracted from one or more layouts (e.g., an IC layout, an IC package layout, a PCB layout, etc.) do not correspond to any existing schematic models or cellview symbols that may be used in simulation schematics, the extracted models for these layout circuit component designs may be constructed anew.

An extracted model may include a simplified model to represent one or more layout circuit component designs in a simulation schematic in some embodiments. In some of these embodiments, an extracted model is placeable in a simulation schematic and includes model connectivity information (e.g., net names, port names, pin names, etc.) that may be used to interconnect the extracted model to one or more other models or external circuitry in the simulation schematic. For example, extracted models may be interconnected by straight or rectilinear flight-lines in some embodiments.

An extracted model may be constructed anew for a layout circuit component (e.g., an instance of a cell or block) and include a flat or a hierarchical structure of multiple hierarchies or a plurality of circuit components. For example, it may be determined that a circuit component design extracted from a layout does not correspond to any existing extracted models.

In some embodiments, an extracted model may be constructed by using a corresponding schematic cellview symbol or model from the schematic design (if available) or from a schematic cellview symbol data structure. For example, various techniques may first examine a schematic symbol cellview data structure (e.g., a list, a table, a database, etc.) to determine whether a schematic cellview symbol exists for the circuit component design. If an existing schematic cellview symbol exists for the circuit component design based on, for example, the type, identification, function, and/or connectivity, etc. of the circuit component design, the schematic cellview symbol may be retrieved from the schematic cellview symbol data structure to represent the layout circuit component.

The schematic cellview symbol may be further associated with other data (e.g., the identifications of ports for interconnection, the identifications of the layer, the instance, the hierarchy, etc.) specific to this particular circuit component to represent this particular circuit component in simulation schematics. In some other embodiments where no schematic cellview symbols or models correspond to the circuit component design extracted from the layout, a new schematic cell view symbol may be constructed anew with a native schematic editor that is capable of natively editing the simulation schematics in one or more design fabrics.

In some of these embodiments, an extracted model may include a geometric entity (e.g., a rectangle) that has any shape or size and is placeable in a simulation schematic or in the schematic design corresponding to the layout from which the circuit design component is extracted. In some other embodiments, an extracted model may include a geometric entity (e.g., a rectangle) that exactly, approximately, or proportionally represents the actual geometries of the circuit component (or circuit components).

These existing and newly constructed extracted models may thus be used to construct a simulation schematic at 106B for the electronic design that spans across multiple design fabrics. One or more layout versus schematic checks may be performed at 110B on the layouts 112B and the simulation schematic determined at 106B to determine whether the simulation schematic determined at 106B correctly corresponds to the layouts of the electronic design in these multiple design fabrics. In some embodiments where at least some schematic designs 118B are available, one or more schematic versus schematic checks may also be performed at 118B on these at least some schematics and the simulation schematic to determine whether the constructed simulation schematic correctly corresponds to these at least some schematics 118B.

The simulation schematic may be incrementally constructed and added as a simulation sub-schematic to a system simulation schematic at 108B. For example, an IC layout may be identified; circuit design components may be extracted from the identified IC layout; extracted models may be identified or constructed anew for these IC layout circuit design components; the simulation sub-schematic for the IC layout may be constructed with these extracted models; and the simulation sub-schematic may be incrementally constructed into a system simulation schematic (e.g., a system simulation schematic for a PCB design including the IC design).

Figure 1C:
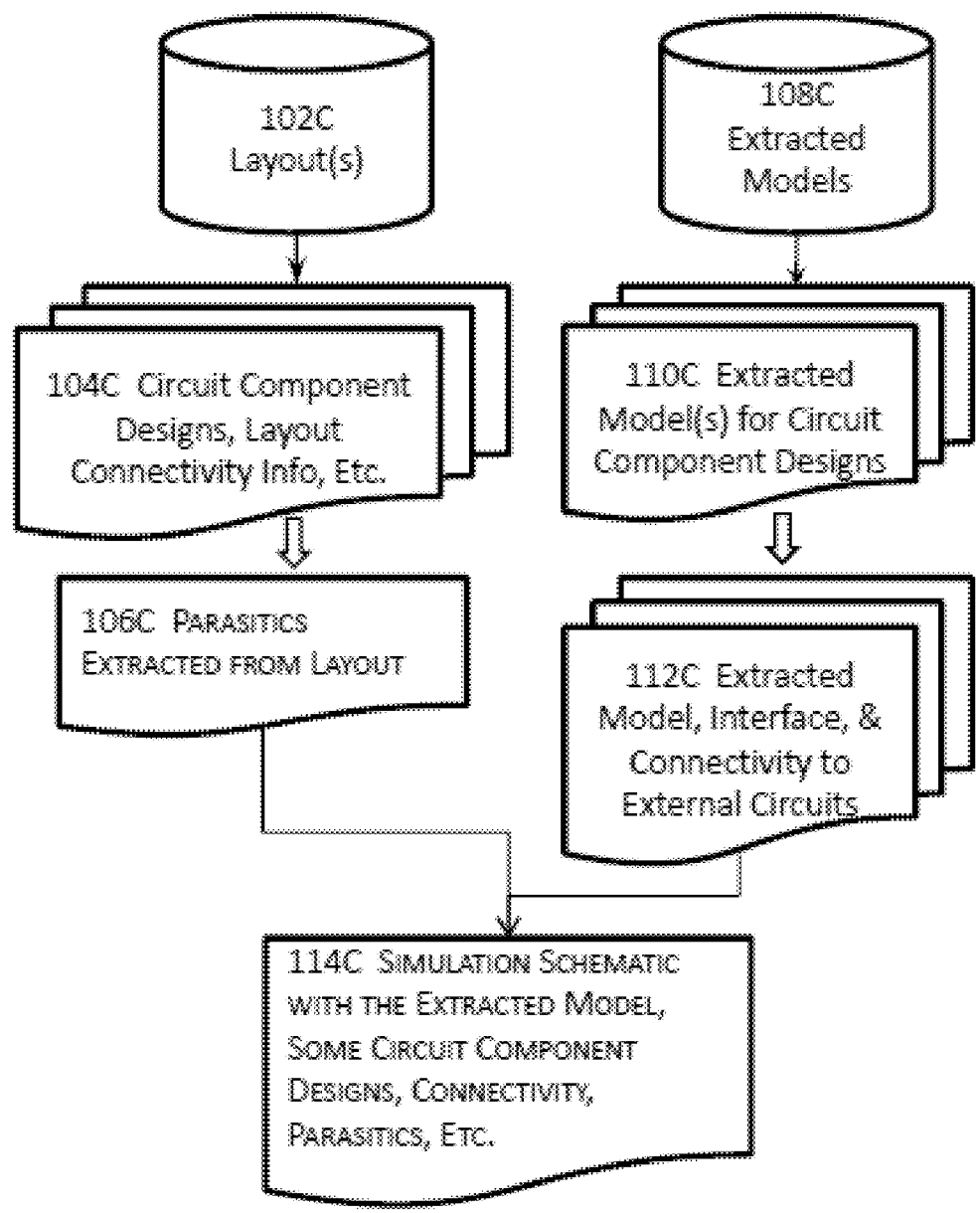
FIG. 1C illustrates another high level schematic block diagrams in one or more embodiments.

FIG. 1C illustrates another high level schematic block diagrams for performing parasitic extraction in one or more embodiments. In these embodiments, one or more layouts (e.g., one or more IC layouts, one or more IC package layouts corresponding to the one or more IC layouts, a PCB layout, etc.) may be identified from a non-transitory computer accessible store medium or device 102C; and existing extracted models corresponding to respective layout circuit components may be retrieved from an extracted model data structure 108C in the same or a different non-transitory computer accessible store medium or device. Circuit component designs and layout connectivity information for interconnecting among these circuit component designs and external circuitry 104C may be extracted from the one or more layouts 102C. Parasitic data 106C may also be extracted from these one or more layouts 102C.

If extracted models 108C exist for at least some circuit component designs in the one or more layout 102C, these extracted models 110C may be retrieved from the extracted model data structure 108C. These existing extracted models, their respective interface information (e.g., the names of the ports, the names of nets connected to the interface, etc.), and/or connectivity information to external circuitry of an extracted model 112C may be identified. In some embodiments, these extracted models themselves may already include or be associated with parasitics and connectivity information.

These existing extracted models for some layout circuit component designs together with newly constructed extracted models for other layout circuit component designs for which no extracted models exist may be placed into a simulation schematic 114C. For example, a layout may include circuit component designs L1, C1, R2, Q4, U1, U2, and L7, where existing extracted models are determined to be available for layout circuit component designs C1, R2, and L7. In this example, the simulation schematic for this layout may include the existing extracted models for C1, R2, and L7 as well as newly constructed extracted models for L1, Q4, U1, and U2.

Figure 1D:
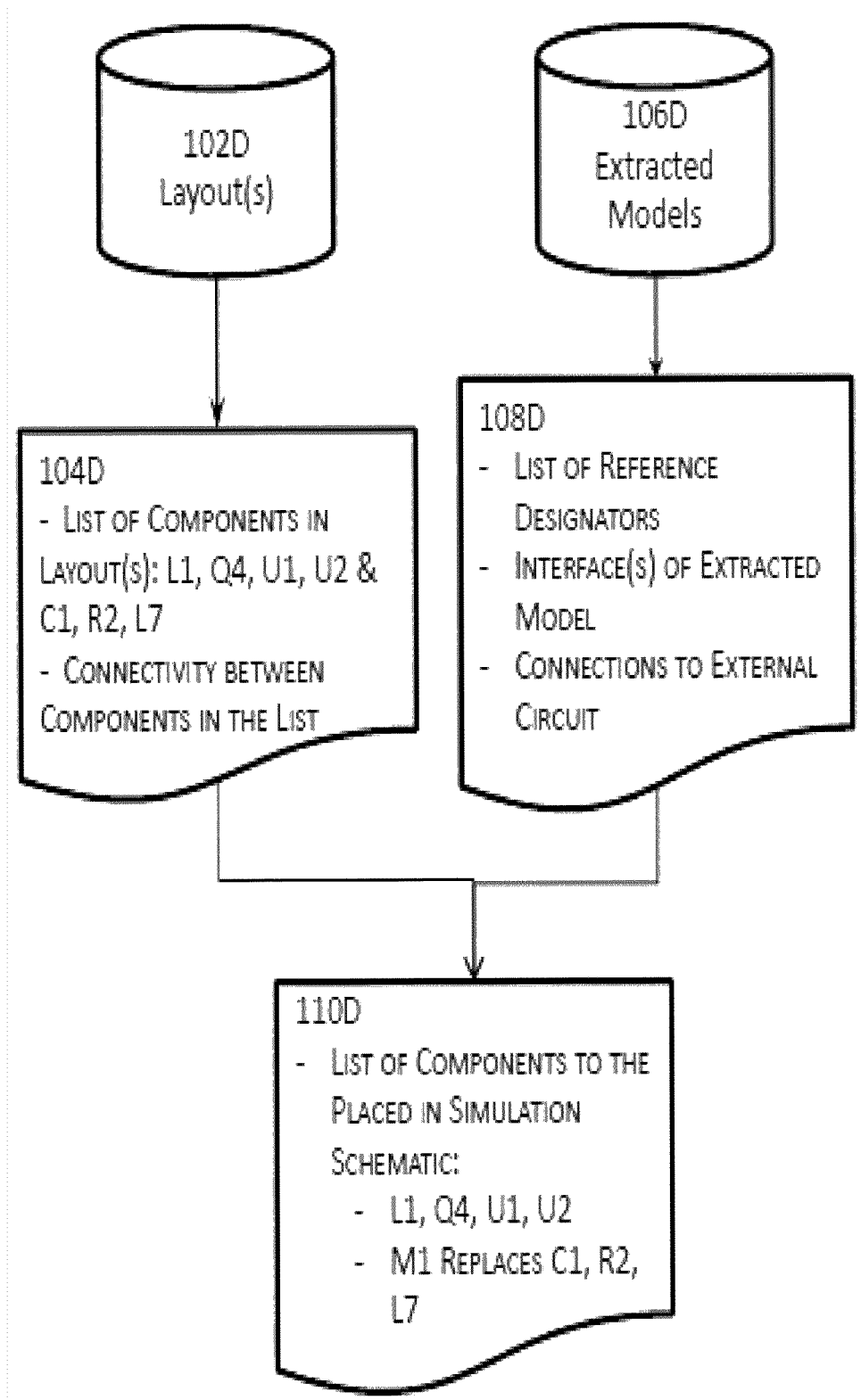
FIG. 1D illustrates an example of determining a list of circuit component designs to place in a simulation schematic in one or more embodiments.

This example is further illustrated in FIG. 1D which illustrates an example of determining a list of circuit component designs to place in a simulation schematic in one or more embodiments. From the layout 102D, a list of circuit component designs 104D in the layout (e.g., L1, Q4, U1, U2, C1, R2, and L7) may be obtained from the layout 102D. In addition, the connectivity between these circuit component designs in the list may also be determined and added to 104D. As described above, an extracted model M1 already exists for the circuit component designs C1, R2, and L7 and may be retrieved from a data structure or database 106D including extracted models. A list of reference designators and the interfaces for the extracted models (e.g., M1) may also be retrieved from the data structure or database 106D. The connectivity information of an extracted model (e.g., M1) may also be retrieved from the data structure or database 106D of extracted models. With the list of components and the connectivity from 104D and the list of reference designators and the interface and connectivity for the extracted model (M1), a list of components or models to be placed in the corresponding simulation schematic 110D may be determined. In this example, the simulation schematic 110D may include the circuit component designs or the schematic symbols or models thereof for L1, Q4, U1, and U2 that do not correspond to any extracted models. The simulation schematic may further include the extracted model M1 that is to replace the circuit component designs (or the schematic symbols or models thereof) for circuit component designs C1, R2, and L7. In some embodiments, an extract model (e.g., M1 in this example illustrated in FIG. 1D) may include, for example, an s-parameter (scattering-parameter) model.

In some embodiments where individual extracted models may not be available or exist, but an aggregated extracted model may nevertheless exist for a plurality of interconnected circuit component designs. In these embodiments, the aggregated extracted model may be identified and used to represent the plurality of interconnected circuit component designs in simulation schematics. In the aforementioned example where no extracted models exist for layout circuit components L1, Q4, U1, and U2, but an aggregated extracted model nevertheless exists and includes these layout circuit components L1, Q4, U1, and U2.

In this example, the aggregated extracted model together with the data of its interface to external circuits, rather than individual extracted models for L1, Q4, U1, and U2, may be used in a simulation schematic in some embodiments. In some embodiments, all the circuit component designs may be first added to a placement list. For a circuit component that corresponds to an existing extracted model, the existing extracted model may be placed in the simulation schematic. For another circuit component design for which no existing extracted models exist, a new extracted model may be constructed and placed into the simulation schematic.

It shall be noted that various techniques described herein do not require schematic designs to perform their intended functions to achieve their intended purposes although elements (e.g., schematic model or cellview symbols, connectivity, etc.) of schematic designs, regardless of whether these schematic designs are complete or partial, may nevertheless be used to reduce the computational resources and/or time needed to constructed a simulation schematic for an electronic design across multiple design fabrics in some embodiments.

A schematic model may include a schematic symbol and connectivity information for interconnecting the schematic symbol to external circuitry. The identified schematic models may be stored in a data structure such as a list, a table, a database, etc. For the ease of explanation or description, the data structure includes and will be referred to as a placement list although other types of data structures may also be used.

Schematic models, like schematic designs, may have the same format or different formats. For example, a PCB schematic design or a PCB schematic model therein may have a different format than an IC schematic design or an IC schematic model therein. In some embodiments, schematic models in different formats may be transformed into a format that is recognized by a native schematic editing tool in one of the multiple design fabrics. For example, PCB schematic models in a first format and IC package schematic models in a second format may be transformed into another format recognizable by an IC schematic editor. In some other embodiments, a new schematic model may be constructed for a schematic model in a different format.

In some embodiments, extracted models may be retrieved from existing sources or constructed anew for layout circuit designs in the layout. An extracted model includes a simplified model having a geometric entity to represent one or more layout circuit component designs in a simulation schematic in some embodiments. In some of these embodiments, an extracted model is placeable in a simulation schematic and includes model connectivity information (e.g., net names, port names, pin names, etc.) that may be used to interconnect the extracted model to one or more other models or external circuitry in the simulation schematic. These extracted models may also be stored in a data structure such as the aforementioned placement list.

In some embodiments, a simulation schematic may be constructed by placing the extracted models into the simulation schematic and further by interconnecting the extracted models with connectivity information extracted from the layout. In some embodiments where schematic cellview symbols or models are also identified for one or more layout circuit components that correspond to no extracted models or aggregated models, the schematic cellview symbols or models may also be placed in the simulation schematic. In addition or in the alternative, parasitic data extracted from the layout may also be stitched into or associated with the corresponding schematic cellview symbols or models or may be placed into the simulation schematic if these schematic cellview symbols or models are also placeable.

In some embodiments, the electronic design includes at least one PCB design having one or more IC package designs interconnected together and encompassing the one or more corresponding IC designs. A schematic model may include an object that includes a schematic symbol, some connectivity information for interconnecting the schematic model to external circuitry, and parasitic information in some embodiments. In some other embodiments, a schematic model may include a schematic cellview symbol or model that is retrieved from a schematic cellview data structure storing therein a plurality of schematic cellview symbols each having one or more parameters awaiting their corresponding one or more values to determine the characteristics or attributes of a specific circuit component that is represented by the schematic cellview symbol or model in a schematic design.

In some embodiments, the schematic cellview symbol or model for a particular layout circuit component may be elaborated by identifying the one or more corresponding parameter values such as names or identifications of the schematic circuit component design represented by the symbol, nets, ports, pins, layer(s), instance(s), etc., interface or interfaces, connectivity information for interconnecting the interface or interfaces to external circuits, or any other information suitable for creating a schematic cellview symbol or model to uniquely represent one or more such schematic circuit component designs in a schematic design.

In some embodiments, layout circuit component designs may be extracted from one or more layouts of the electronic design spanning across multiple design fabrics. In some embodiments, these layout circuit components or information therefor (e.g., identifications of layout circuit component designs with pointers, link structures, or symbolic links to these layout circuit component designs) may be stored in a data structure such as a list, a table, a database, etc. such as a placement list.

One or more layout extracted models corresponding to the one or more identified layout circuit component designs may be retrieved or extracted from a non-transitory computer accessible storage medium or device. In some embodiments where no extracted models are available for certain layout circuit component designs, additional extracted models may be constructed anew for these certain layout circuit component designs. An extracted model includes a simplified model to represent one or more layout circuit component designs in a simulation schematic in some embodiments.

In some of these embodiments, an extracted model is placeable in a simulation schematic and includes model connectivity information (e.g., net names, port names, pin names, etc.) that may be used to interconnect the extracted model to one or more other models or external circuitry in the simulation schematic. In addition or in the alternative, an extracted model may further include parasitic information that is stitched into or associated with the elements (e.g., circuit components, traces, wires, interconnects, etc.), parasitic models encompassing the parasitic information, or a combination thereof.

In some embodiments, existing parasitic models indicative of parasitic information or data of one or more layout circuit components may be identified. A parasitic model may include an s-parameter or SPICE model that represents the R/L/C parasitics of the traces, interconnects, and/or metal structures in an electronic design. In some embodiments where parasitic models are unavailable for certain layout circuit component designs, new parasitic models may be constructed by extracting the corresponding parasitic information or data for these layout circuit component designs from the layout.

In some embodiments, connectivity may include, for example, how various circuit component designs in the PCB layout are connected, the terminal order and/or identifications of an interface of a circuit component design, and/or a mapping to a split symbol instances or nets, etc. in some embodiments. A testbench may be created at by updating the simulation schematic via cross-probing, updating parameter values, and/or modifying the underlying electronic design in some embodiments.

In some embodiments, a layout versus schematic check may be performed on the testbench created by referencing the PCB layout in some embodiments to cross check the correctness of the testbench, the simulation schematic, and/or the PCB layout. In some embodiments where the PCB schematic is available, a schematic versus schematic check may also be performed on the simulation schematic or the testbench by referencing the PCB schematic to cross check the correctness of the testbench, the simulation schematic, and/or the PCB schematic.

In some embodiments, the testbench may be represented in a hierarchical structure at according to the hierarchical structure of the PCB design in some embodiments or in a flat structure having only one hierarchical level in some other embodiments. Simulations may be performed with the simulation schematic to generate simulation results including, for example, waveforms of signals, etc. In some embodiments where the PCB schematic is available, the PCB schematic may also be associated with the simulation results generated previously.

Figure 2:
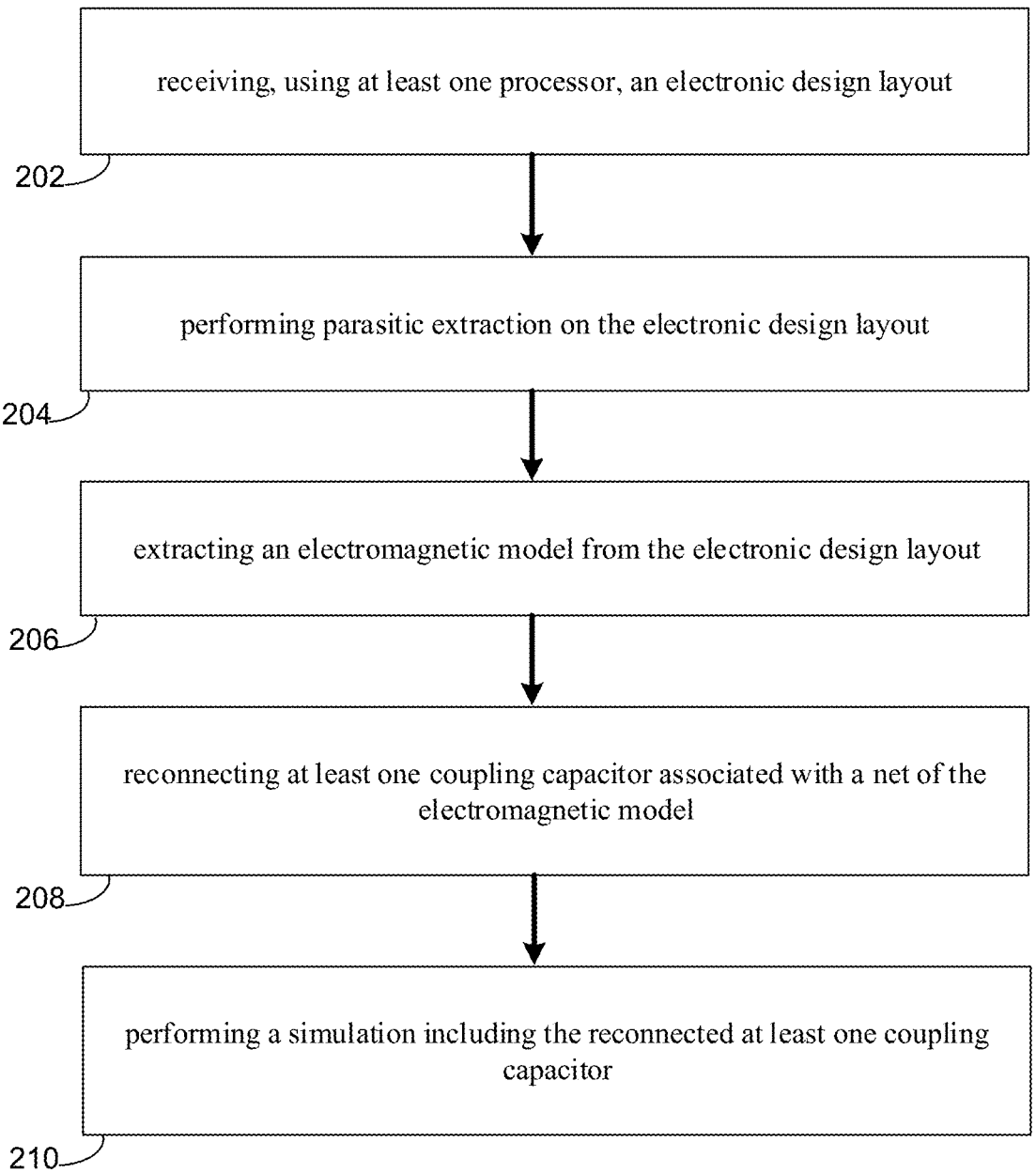
FIG. 2 illustrates a flowchart depicting operations consistent with embodiments of a parasitic extraction process consistent with embodiments of the present disclosure.

FIG. 2 illustrates a high-level flowchart that includes one or more operations that may be employed for use in an electronic design environment is provided. The method may include receiving (202), using at least one processor, an electronic design layout and performing (204) parasitic extraction on the electronic design layout. The method may further include extracting (206) an electromagnetic model from the electronic design layout and reconnecting (208) at least one coupling capacitor associated with a net of the electromagnetic model. The method may include performing (210) a simulation including the reconnected at least one coupling capacitor. Numerous other operations are also within the scope of the present disclosure.

Figure 3:
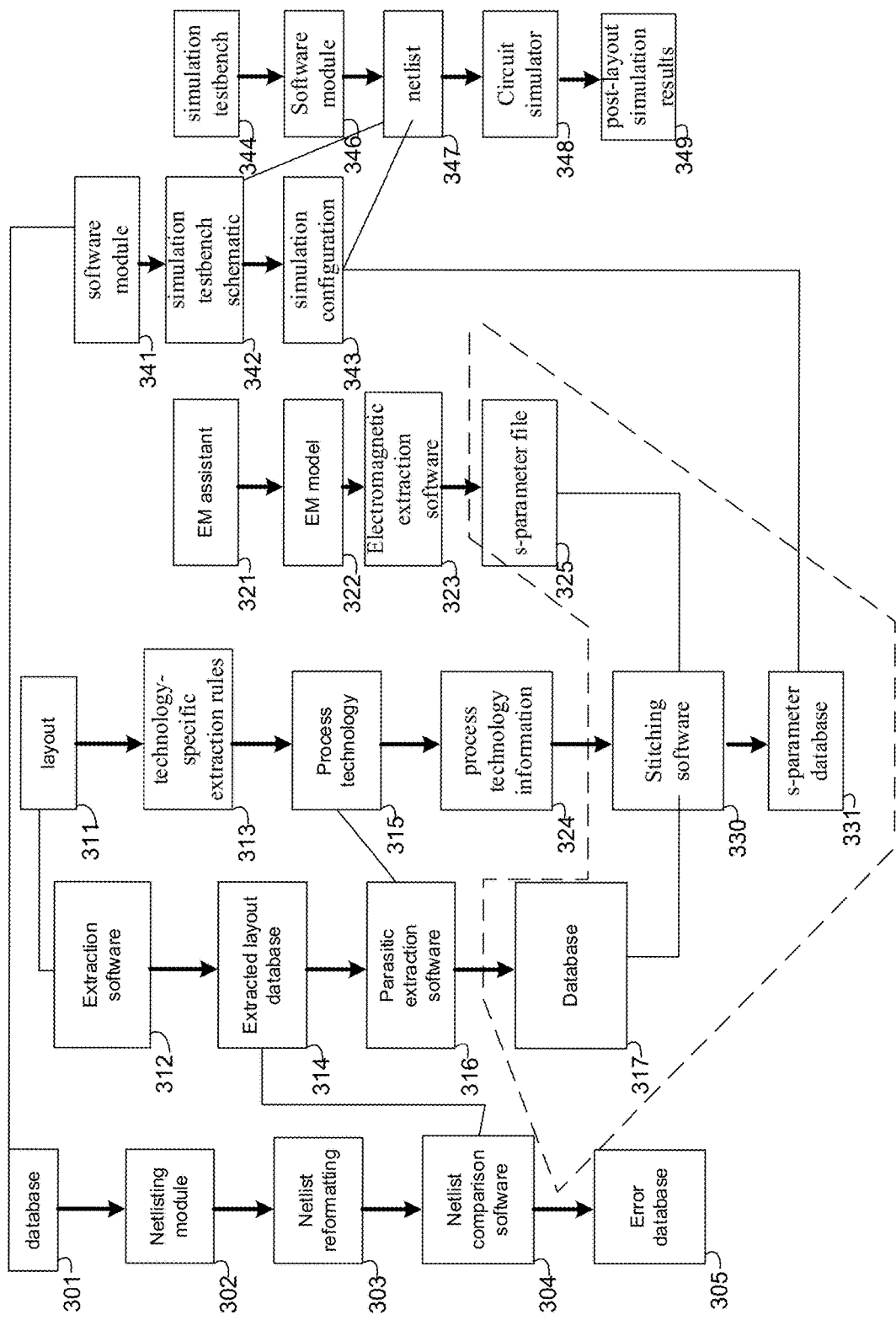
FIG. 3 illustrates a flowchart depicting components and operations consistent with embodiments of a parasitic extraction process consistent with embodiments of the present disclosure.

Referring now to FIG. 3, a diagram 300 consistent with embodiments of the parasitic extraction process described herein is provided. Database 301 may store a schematic representation of the design including device symbols and connectivity information for connecting these devices in OpenAccess format. Netlisting module 302 may translate the schematic database 301 into readable text format (ASCII) following the CDL standard for circuit netlists 303.

In some embodiments, database 311 may store the physical representation (e.g., layout) of the design in OpenAccess format. LVS extraction software 312 may use technology-specific extraction rules (e.g., extract runset) 313 to identify devices and their connections from layout shapes. The output of extraction software 312 is an extracted layout database 314. Extracted layout database 314 may include devices and their connections (e.g., layout netlist) as drawn in layout 311. Extracted layout database 314 may further include shape information. The netlist comparison software 304 may compare CDL netlist 303 with layout netlist 314 and store the result in error database 305. Layout connectivity database 314 may include only devices drawn in layout 311 and their connections. It may not contain parasitic information for the connections between devices (interconnects).

In some embodiments, parasitic extraction software 316 may take shape information (e.g., layer and location of shapes) from database 314 and technology process information (e.g., the height of metal layers, their resistivity, etc.) from process technology to calculate the resistance and the capacitance of the interconnects (e.g., parasitic information). Parasitic extraction software 316 may combine the layout connectivity extracted in database 314 with the parasitic information extracted using parasitic extraction software 316 to a single output database 317. Database 317 may store the designed devices extracted from the layout, their connections, and the parasitic devices extracted from the interconnects.

In some embodiments, graphical user interface 321 (e.g., EM Assistant) may allow the user to interactively select any combination of passive devices and nets to define an electromagnetic (EM) model 322. EM model 322 may be part of layout 311. EM model 322 may include a subset of devices and nets from layout 311. Electromagnetic extraction software 323 may use process technology information 324 and layout information 322 to perform 3D-electromagnetic simulation and store the results as an s-parameter file 325.

In some embodiments, while database 317 may represent the entire layout 311 including parasitic information 316, s-parameter file 325 may represent only selected passive devices and the parasitic information of selected nets. S-parameter file 325 may model the RF critical part. Stitching software 330 may add the s-parameter model for the RF-critical part, such as s-parameter file 325 to database 317. To avoid double-counting of parasitics the partial RC network in database 317 that corresponds to the model in s-parameter file 325 may be taken out of database 317. All these steps are done in S-parameter stitching 330. The result may be stored in s-parameter database 331. Re-connection of coupling caps may be applied using S-parameter stitching module 330. When taking out a part of database 317 there are coupling capacitances where on pin connects to the RF critical part that is replaced by s-parameter file 325 and the other pin connects to the less RF critical part that is left in. Therefore, one pin of these capacitors remains dangling. Embodiments included herein address these re-connections.

In some embodiments, software module 341 uses schematic 301 and creates a symbol view that is used in the simulation testbench schematic 342. Simulation configuration 343 may define stitched view 331 to be used for post-layout circuit simulation. Software module 346 may use the input from simulation testbench 344, existing pre-characterized device models 345 and the simulation configuration 343 to create a readable text output (ASCII) in spectre format 347. Circuit simulator 348 may use the spectre netlist 347 to create post-layout simulation results 349. To accurately capture high frequency effects any RF critical parts of the electronic layout must be extracted using a three dimensional ("3D") electromagnetic solver. For the remaining, less RF critical parts of the design, parasitic extraction with existing tools is sufficiently accurate and saves extraction and simulation run time. These parasitic extraction tools model parasitic effects of physical structures in an RC netlist. Parasitic devices may generally relate to metal shapes in the layout. In most cases a single layout net is cut in multiple parasitic resistors and the capacitive coupling between two nets is modeled in an resistor/capacitor ("RC") chain. Unlike a parasitic extraction tool, an electromagnetic ("EM") solver returns an s-parameter model (n-port). The EM solver may be configured to solve Maxwell equations for metal structures and to generate an s-parameter file. A resulting EM model may be generated that includes a collection of passive components and nets for which parasitic effects are extracted using the EM solver.

Using combinations of these tools both results may be combined by stitching the n-port model from the EM solver to the parasitic RC network from a parasitic extraction tool, replacing parts of the RC network with an s-parameter model. When extracting two nets with the parasitic extraction tool these nets may be cut in to multiple fragments. Each fragment of a first net may couple to multiple fragments of a second net. Replacing the parasitics of the first net by an n-port model removes internal nodes, and the coupling capacitors to the second net need to be reconnected.

Figure 4:
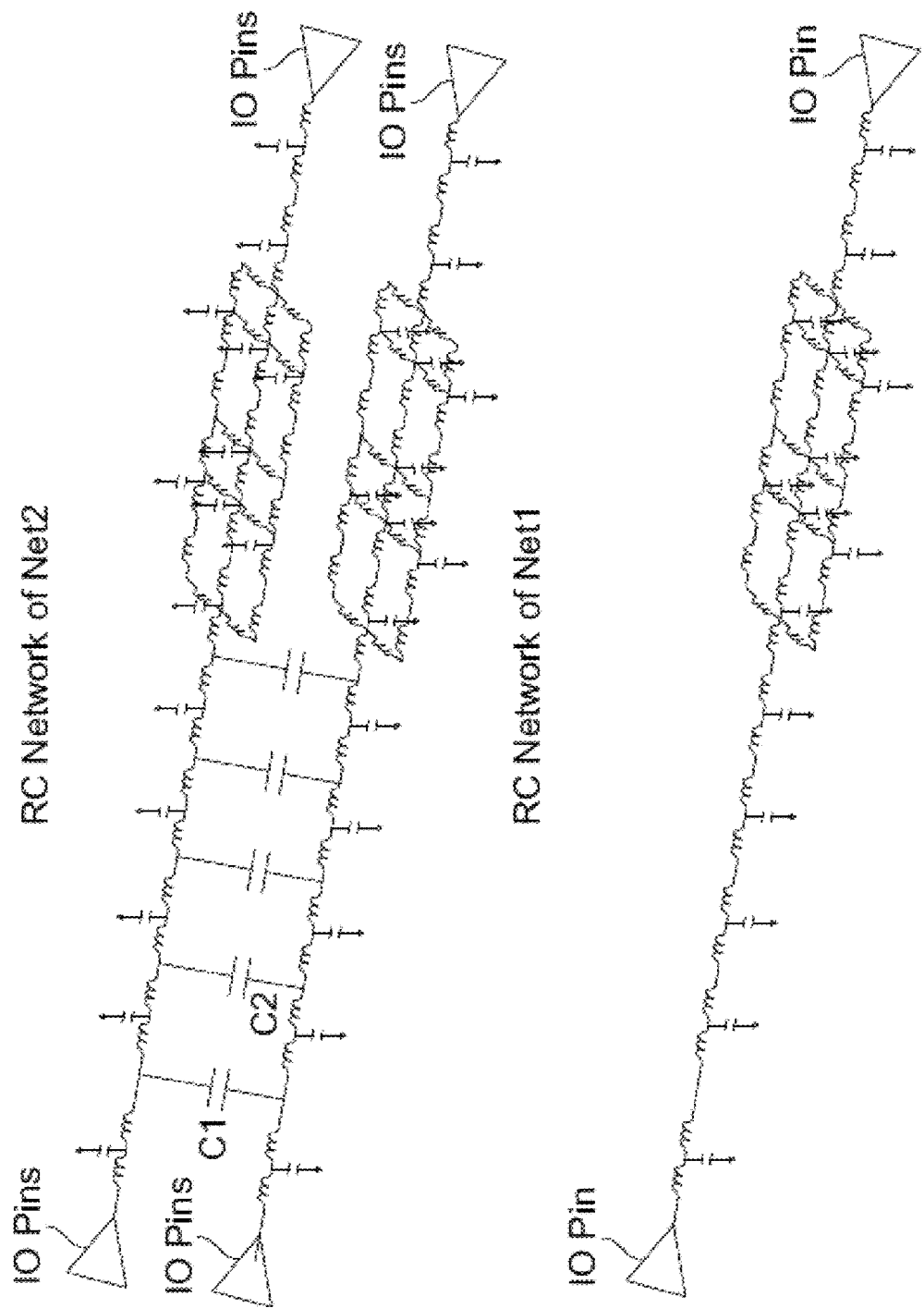
FIGS. 4-9 illustrate examples of RC networks consistent with embodiments of the present disclosure.
Figure 5:
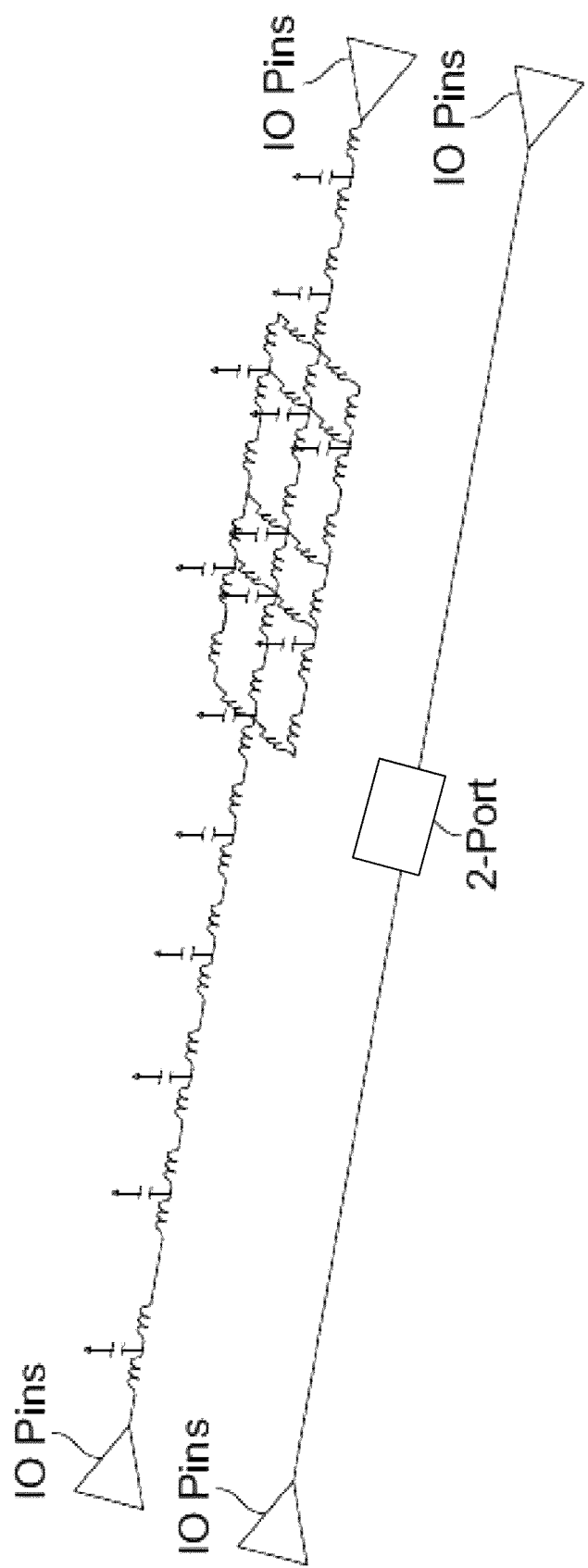

Referring now to FIGS. 4-5, embodiments showing examples of capacitive coupling between two nets are provided. As discussed above, embodiments of the parasitic extraction process described herein provide multiple approaches for reconnecting one or more coupling capacitors. The choice which method to use depends on the application and its accuracy requirements, and is left to the end user. FIG. 4 shows two RC networks, one for net1 and one for net 2 with coupling capacitors located therebetween. The EM solver extraction of net1 is shown at the bottom diagram of FIG. 4. It should be noted that EM solver meshing may occur independently from parasitic extraction meshing. FIG. 5 shows the result after EM-stitching is performed. In existing approaches, any coupling between net1 and net2 is neglected. In contrast, the re-connection of coupling caps C1, C2, etc as provided herein allows for better accuracy of the simulation results.

In some embodiments, the parasitic extraction process of the present disclosure may be configured to reconnect one or more coupling capacitors between RC-modeled and EM-modeled physical nets. For example, the coupling capacitors may be re-connected to ground, to the closest port of the s-parameter model, and/or to one or more nodes of the internal mesh of the electromagnetic simulator. Each of these is discussed in further detail hereinbelow. It should be noted that in existing approaches the second node of these coupling capacitors typically remain dangling which is electrically inaccurate for many cases.

Figure 6:
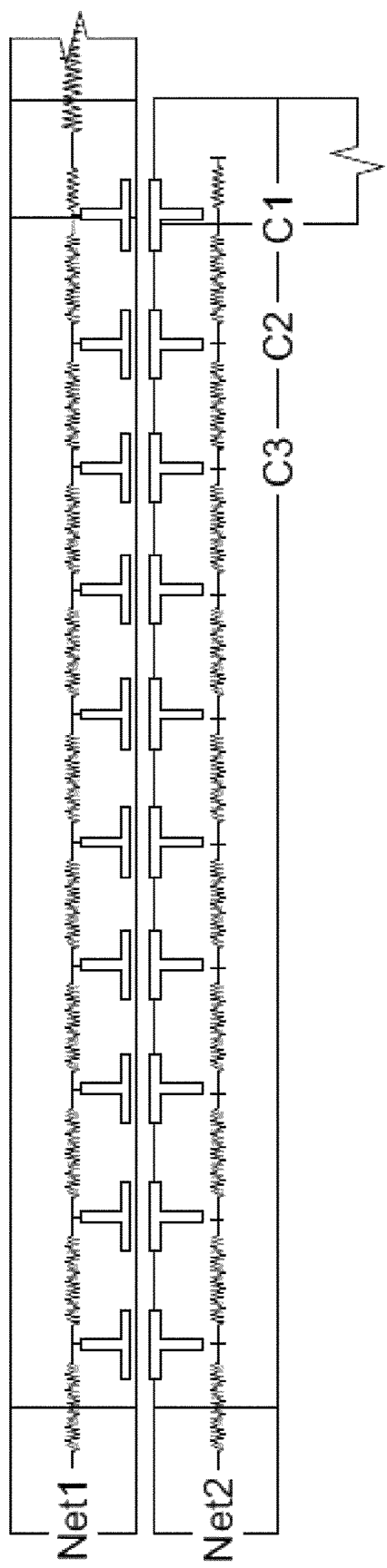
Figure 7:
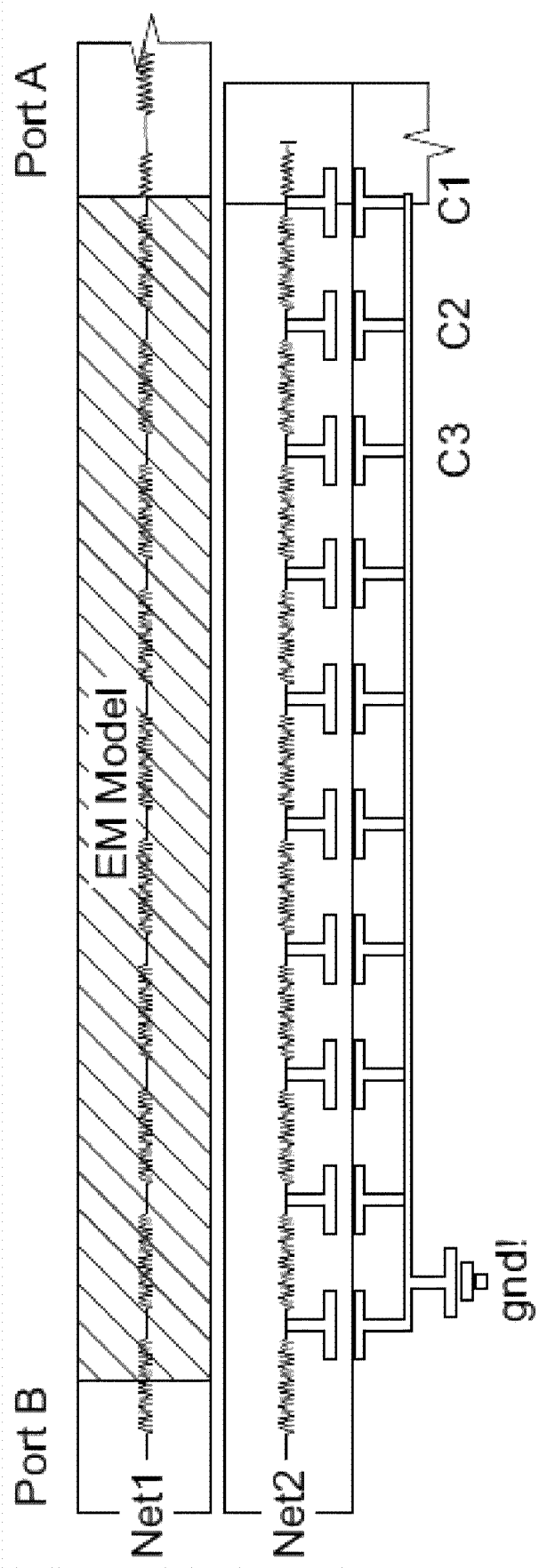

Referring now to FIGS. 6-7, embodiments of the parasitic extraction process showing examples of reconnecting the coupling capacitors to ground are provided. In the EM-modeled nets internal nodes may be removed and the parasitic capacitors connecting to these nodes remain dangling. In operation, and in this particular example, a parasitic extraction tool may extract coupling capacitors between net1 and net2. Net1 may be replaced by the electromagnetic simulator extracted s-parameter file (e.g., the net1 subnodes vanish). FIG. 6 shows the initial RC network having coupling capacitors located between net1 and net2 and FIG. 7 shows the reconnection of the coupling capacitors where net1 is defined as an EM model. In this way, the capacitive load on net2 may be captured.

Figure 8:
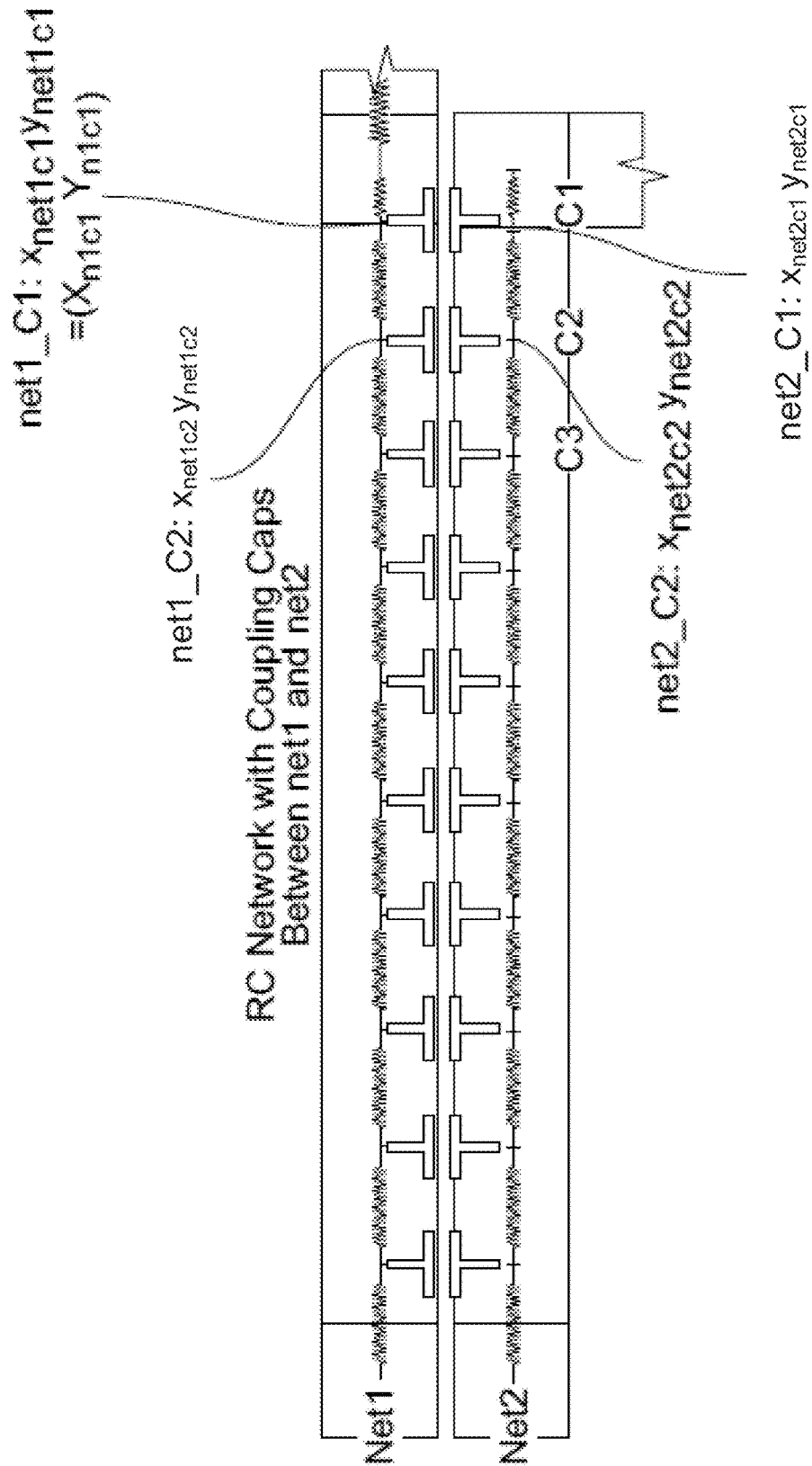
Figure 9:
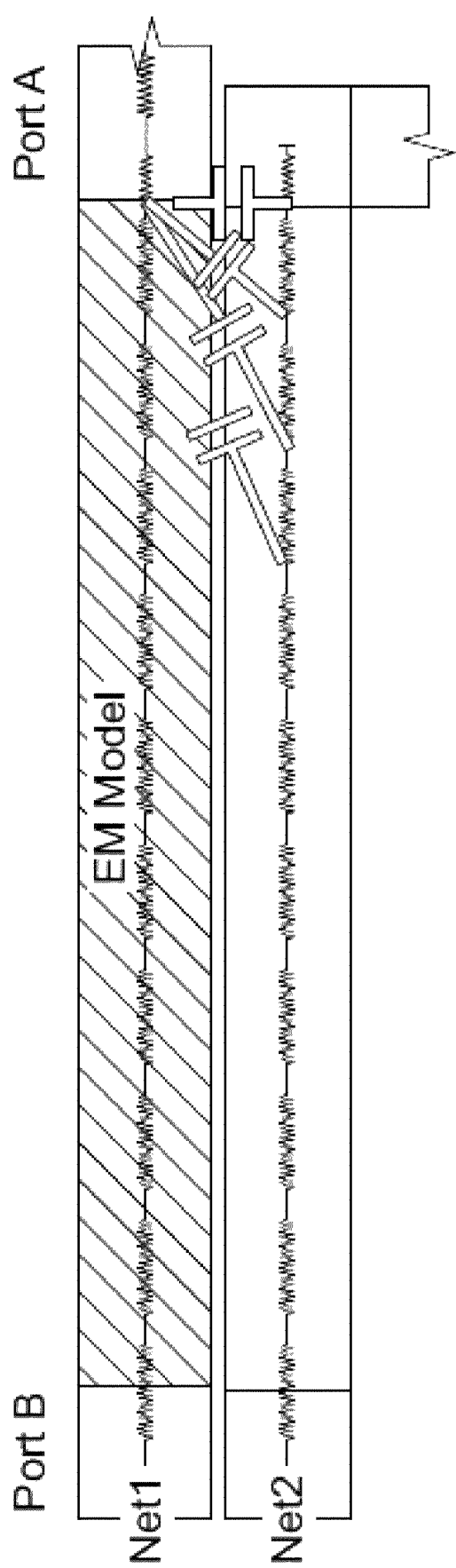

Referring now to FIGS. 8-9, embodiments of the parasitic extraction process showing examples of reconnecting the coupling capacitors to the closest ports of the EM model are provided. The electromagnetic solver may model a physical net using one or more s-parameters. Every connection to this net (e.g., a device terminal, an IO pin of the cell, etc.) may become a port. Accordingly, every electromagnetic modeled net may include as many ports as it has connection points to the remaining circuit.

In some embodiments, the parasitic extraction process may be configured to calculate the geometrical distance between the capacitor node and every electromagnetic port, and reconnect the dangling node to the closest port. If multiple nets are included in the EM model the capacitor may be reconnected to the closest port of the respective net.

FIG. 8 shows an example RC network with coupling capacitors between net1 and net2. The position of coupling capacitor nodes in the layout is shown in the right hand portion of FIG. 8. FIG. 9 shows an example with a reconnection of coupling capacitors where net1 is defined as an EM model.

In this example, the position of ports in the layout is set forth below:

$$\text{Port } A: (x_{a1}; y_{a1})(x_{a2}; y_{a2})$$
$$\text{Center}_{portA} = {}^{1/2}(x_{a1} + x_{a2})^{1/2}(y_{a1} + y_{a2}) = (x_{pA}; y_{pA})$$
$$\text{Port } B: (x_{b1}; y_{b1})(x_{b2}; y_{b2})$$
$$\text{Center}_{portB} = {}^{1/2}(x_{b1} + x_{b2})^{1/2}(y_{b1} + y_{b2}) = (x_{pB}; y_{pB})$$

In this example, the distance of coupling capacitors to ports is set forth below:

$$\Delta_{portA} = \sqrt{(x_{n1c1} - x_{pA})^2 + (y_{n1c1} - y_{pA})^2}$$
$$\Delta_{portB} = \sqrt{(x_{n1c1} - x_{pB})^2 + (y_{n1c1} - y_{pB})^2}$$

Wherein, $$\Delta_{portA} < \Delta_{portB} \Rightarrow (x_{n1c1\_new}; y_{n1c1\_new}) = (x_{pA}; y_{pA})$$

$$\Delta_{portB} < \Delta_{portA} \Rightarrow (x_{n1c1\_new}; y_{n1c1\_new}) = (x_{pB}; y_{pB})$$

Figure 10:
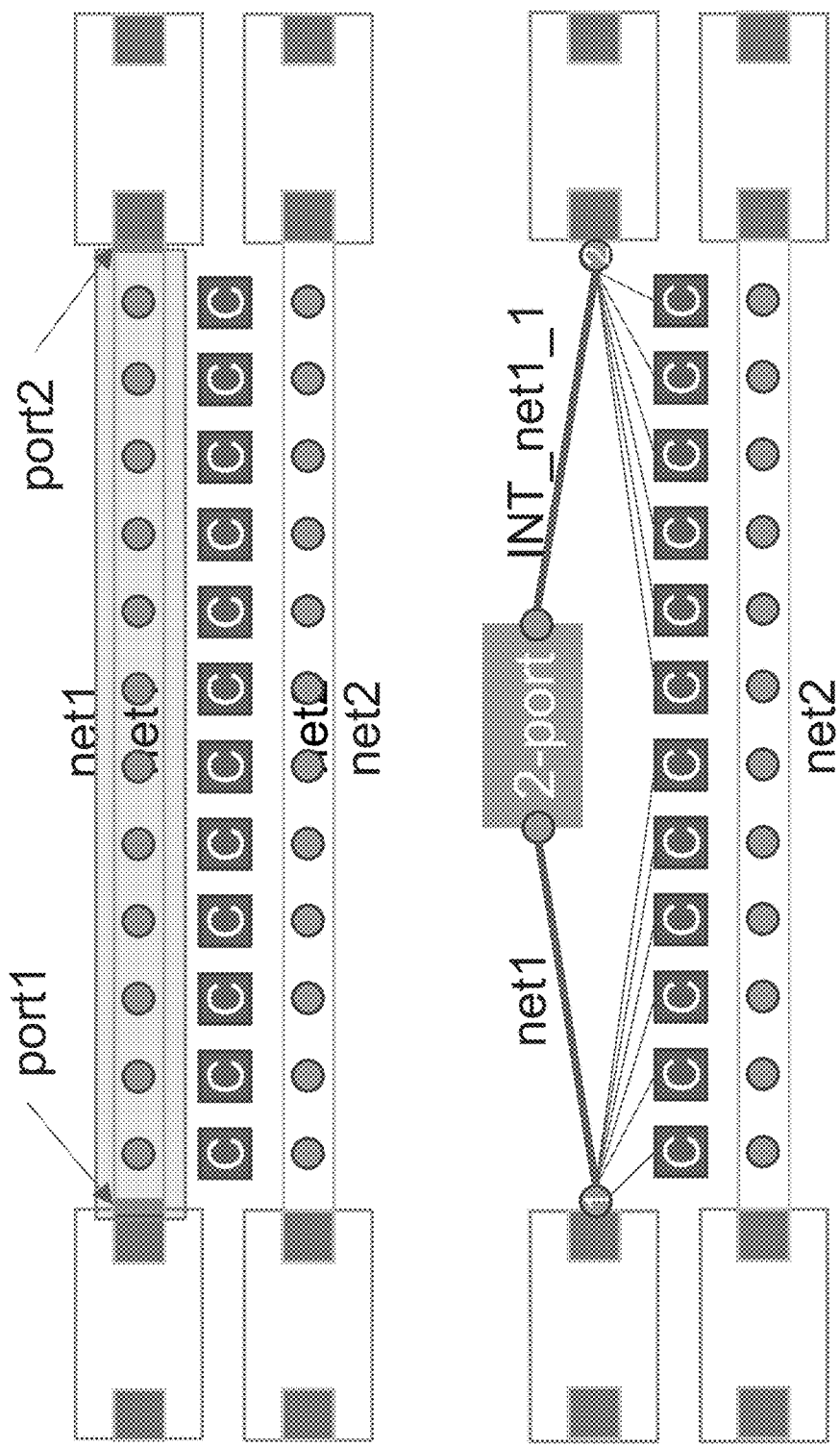
FIGS. 10-15 illustrate examples showing different topologies of an electromagnetic model consistent with embodiments of the present disclosure.
Figure 11:
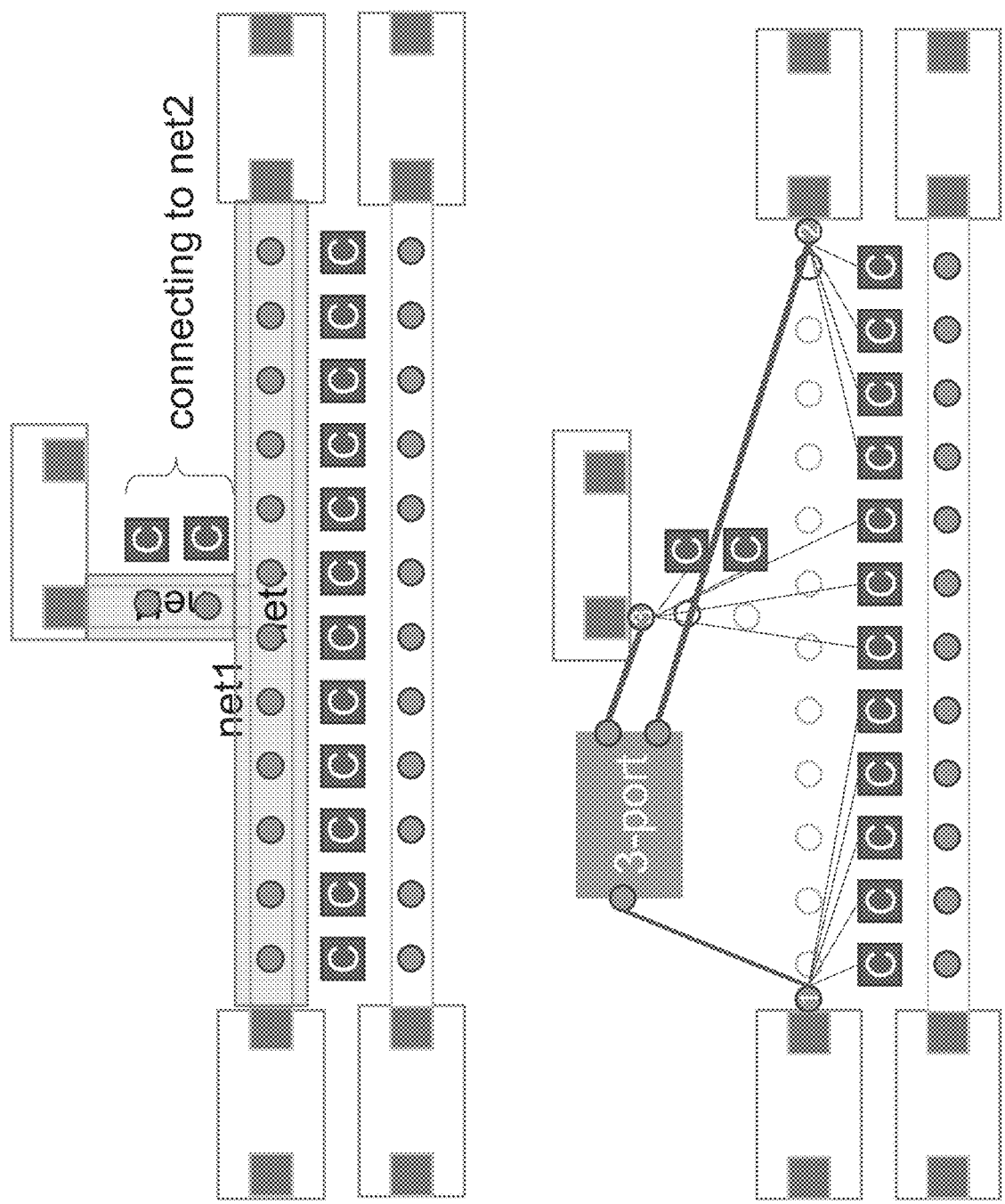

Referring now to FIGS. 10-11, embodiments of the parasitic extraction process showing examples of different topologies of an EM model are provided. This particular example depicts a single net having multiple ports. Parasitic extraction process may be configured to reconnect the coupling capacitors to the closest port. In this example, the EM model is "net1" and the x, y location of the ports may be defined in the EM Assistant 321 as shown in FIG. 3. In operation, the process may be configured to measure the distance from the initial node location to all ports and to re-connect to the closest one. It should be noted that the node on the EM modeled net may be taken as the reference for the shortest distance computation (e.g., in this case all nodes on net1). The result after stitching may depend on whether net1 is primary or secondary oaParasiticNet, which is an OA data structure where parasitic components (e.g., R,C,L,K) are included. R and L may capture parasitic effects of one single net; C and K may capture parasitic effects between two nets. When the net is removed all parasitic components may also be removed.

Figure 12:
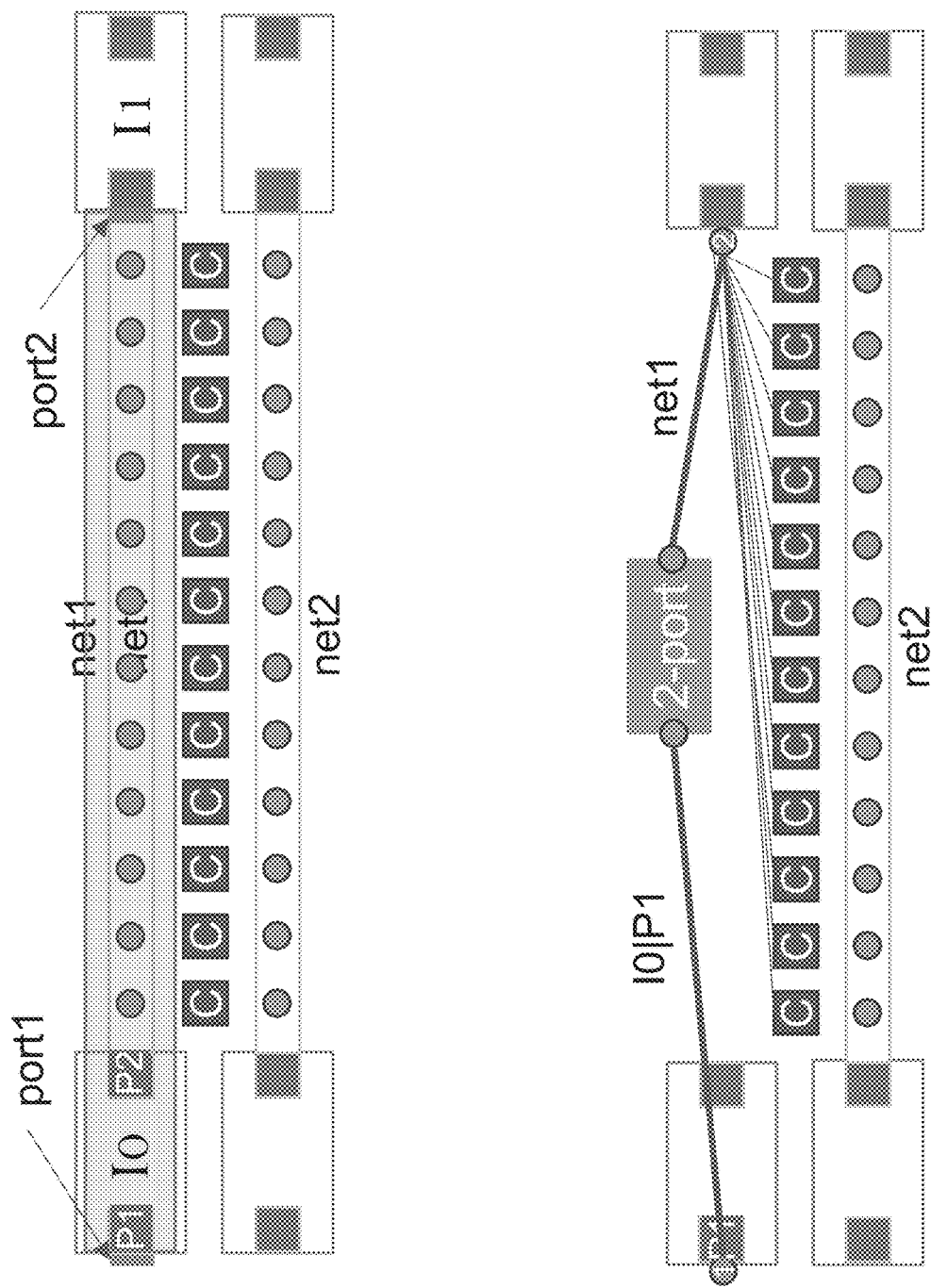
Figure 13:
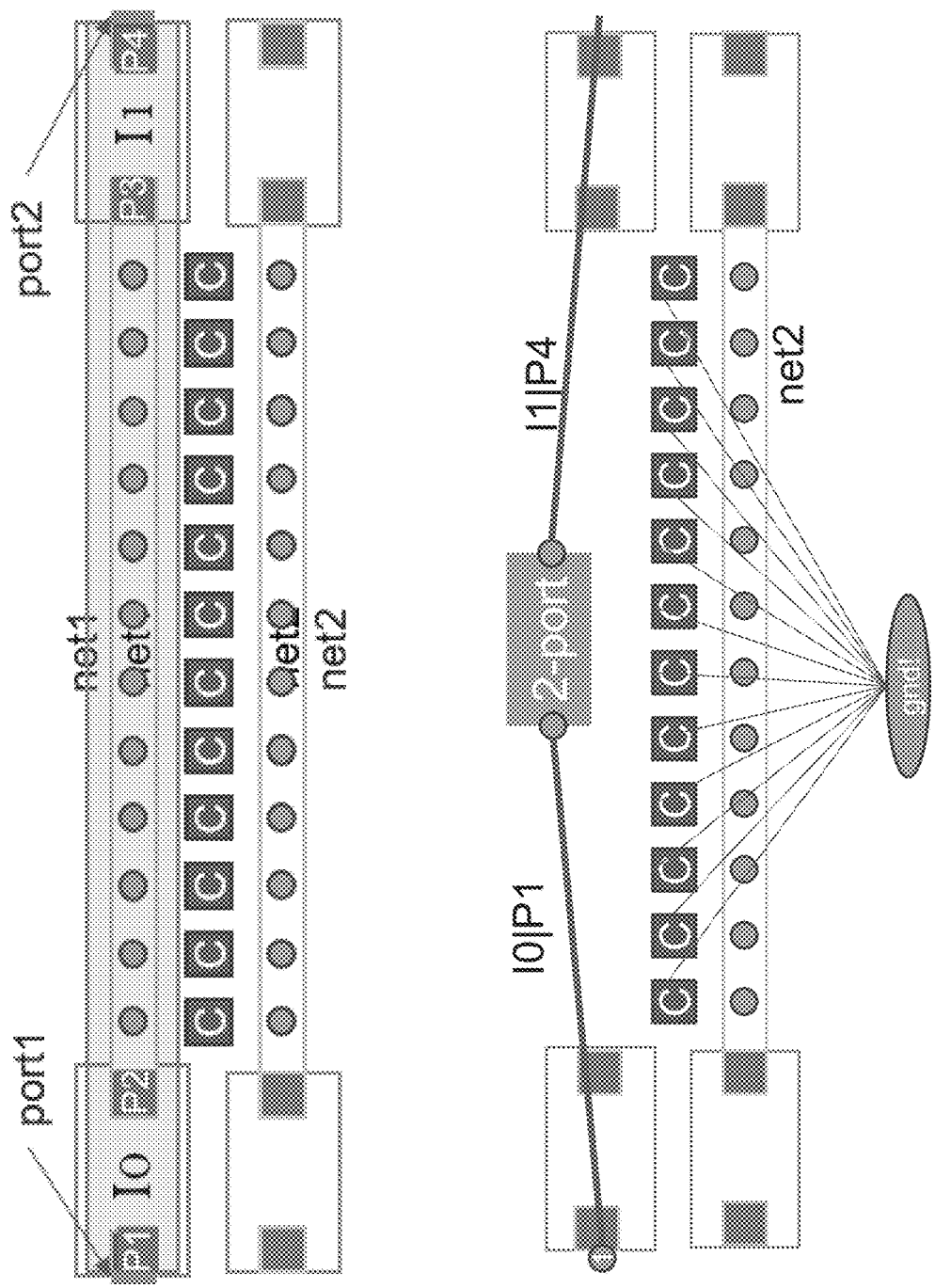

Referring now to FIGS. 12-13, embodiments of the parasitic extraction process showing examples of different topologies of an EM model are provided. This particular example depicts an EM model including passive devices or hierarchically compared cell ("hcell"). An hcell file may provide a mapping of a layout name to a schematic name. In this particular example, I0 and I1 may be either devices or hcells and they may have any number of pins. In FIG. 12, the EM model is "net1+I0" and I1 is not part of the EM model. There is no trace from P1 to P2 inside I0 and the process may reconnect coupling capacitors to the closest port on net1. In FIG. 13, the EM model is "net1+I0+I1" and net1 may be entirely embedded in the EM-model. There is no trace from P1 to P2 inside I0 and there is no trace from P3 to P4 inside I1. The process may reconnect coupling caps to ground as shown in FIG. 13.

Figure 14:
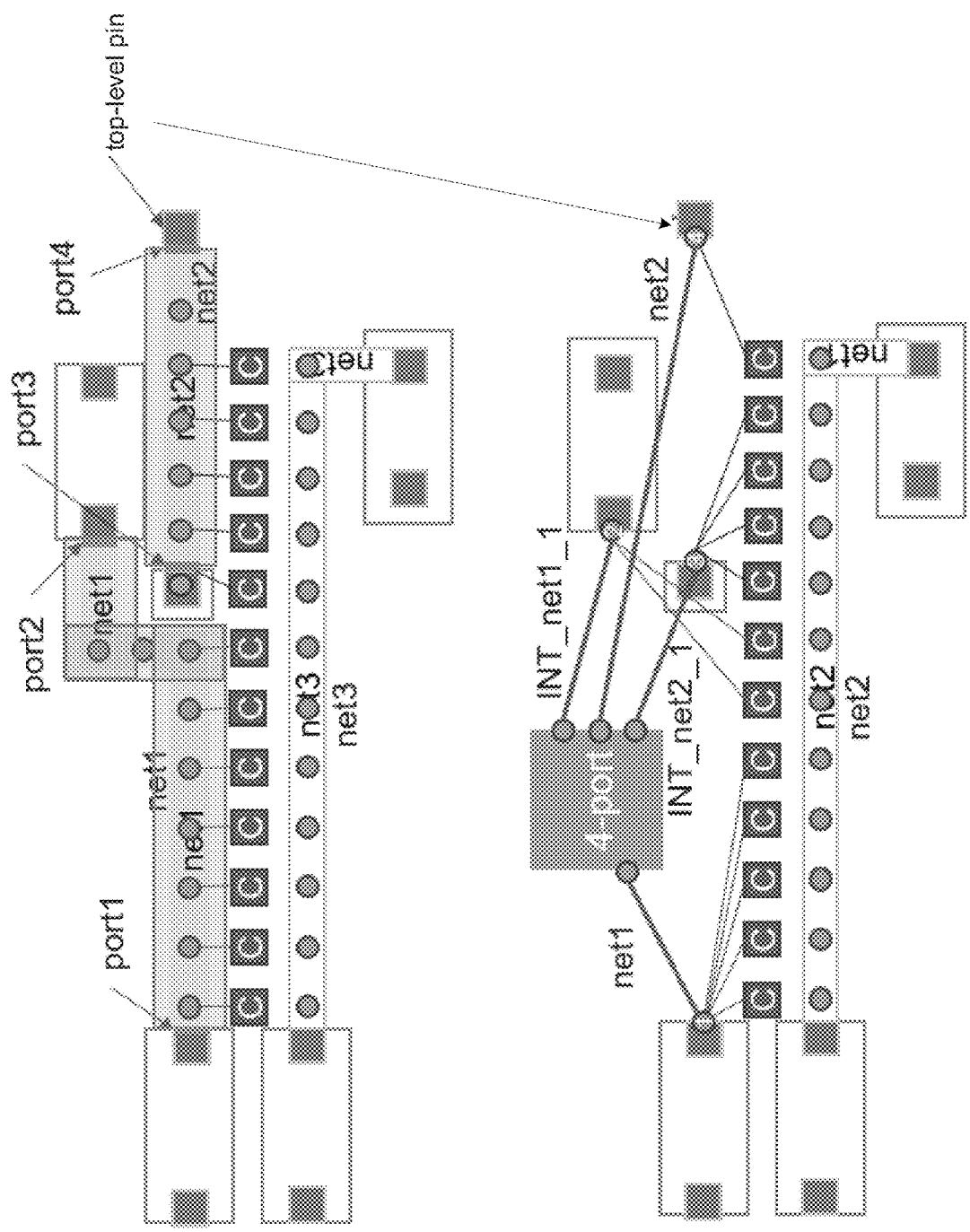

Referring now to FIG. 14, an embodiment of the parasitic extraction process showing an example of different topologies of an EM model is provided. This particular example depicts multiple nets and cell-level pins. Parasitic extraction process may be configured to connect to the closest port on the same net without connecting to a port on a different net. In this example, the net connecting to the top-level pin may keep the original name (e.g., net2). Additional nets are INT_<netname>_1, INT_<netname>_2, etc.

Figure 15:
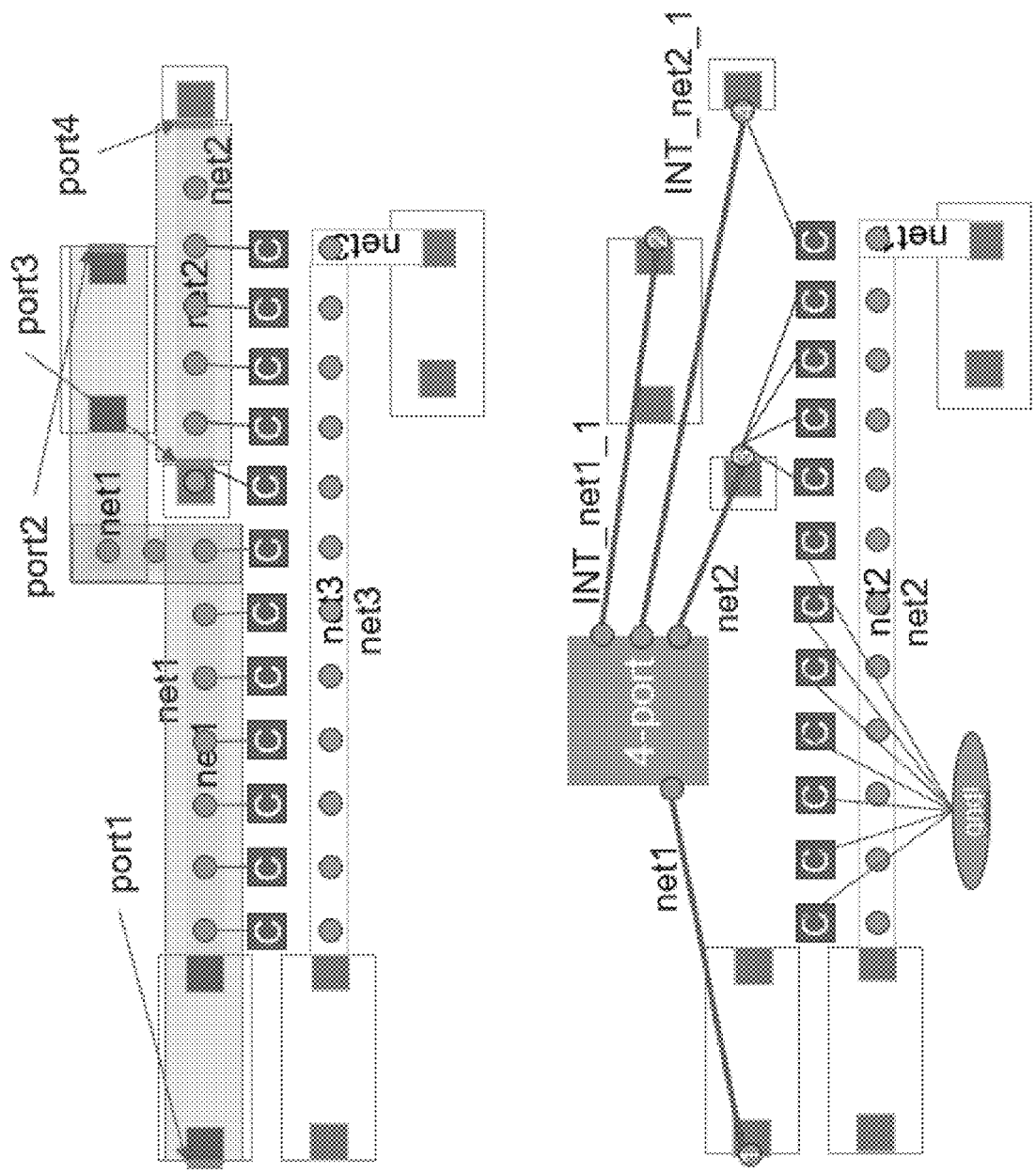

Referring now to FIG. 15, an embodiment of the parasitic extraction process showing an example of different topologies of an EM model is provided. This particular example depicts multiple nets (embedded and non-embedded nets). Parasitic extraction process may be configured to connect to the closest port on the same net without connecting to a port on a different net. In this example, if the net is completely embedded then connect to ground.

Figure 18:
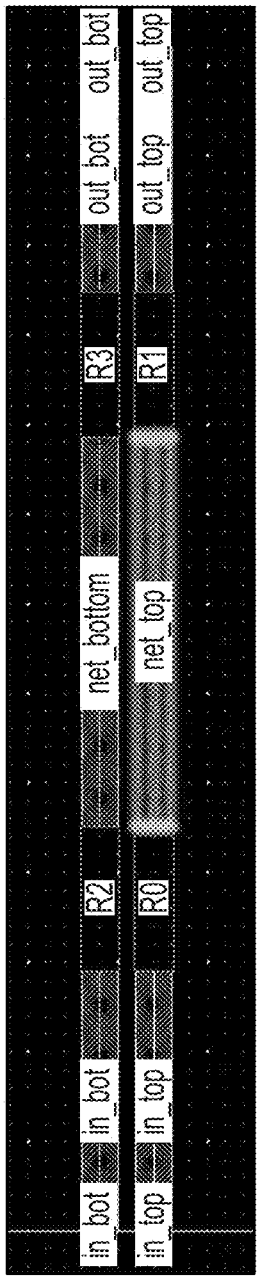

In existing systems it should be noted that for the above listed topologies the coupling between net1 and net2 is neglected. In contrast, embodiments of the parasitic extraction process described herein may re-connect one or more coupling capacitors to the closest port (non-embedded nets) and may capture the capacitive load on non-EM model nets. The process may provide a coupling between EM model nets and non-EM model nets and may reconnect coupling capacitors to ground (embedded nets). FIGS. 16-17 show output netlists showing an example of reconnecting the coupling capacitors to ground (e.g., Environment variable: cfde.smartview couplingCapMode cyclic "ground") and FIG. 18 shows output netlists showing an example of reconnecting the coupling capacitors to the closest port (e.g., "Environment variable: cfde.smartview couplingCapMode cyclic "position").

Figure 19:
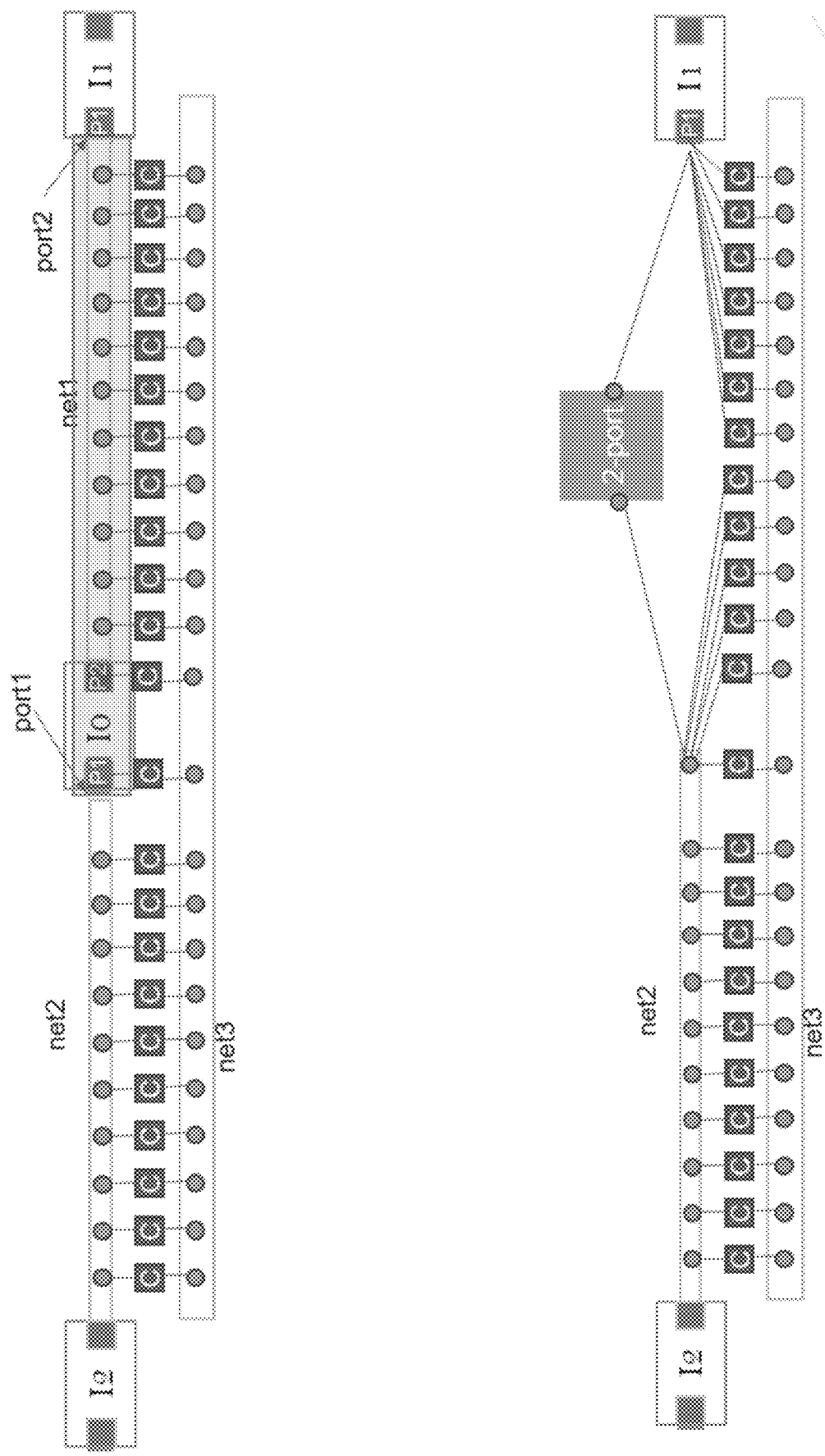
FIGS. 19-20 illustrate examples of pin to pin tracing consistent with embodiments of the present disclosure.

Referring now to FIGS. 19-22, embodiments of parasitic extraction process depicting pin to pin tracing for instances embedded in an EM model are provided. In the example of FIG. 19, I0 may be included in the EM model along with a trace on one or multiple pins. Accordingly, the pin reference (included in the EM model) on net1 may be absorbed in the EM model (e.g., I0-P2). In this example the only candidate reconnection point for coupling capacitors would be I1-P1. This would make the coupling capacitor reconnection very skewed. Thus, for each connection absorbed in the EM model, a pin-to-pin tracing may be performed (e.g., I0-P2 would be traced to I0-P1). The parasitic node connected to I0-P1 is on a different net however it may be a better reconnection candidate for coupling capacitors, if there is a metal connection from I0-P1 to I0-P2 inside I0 (only in this case I0-P1 is a valid re-connection point for the coupling caps). A possible EM model connection and coupling capacitor distribution is shown at the bottom of FIG. 19.

Figure 20:
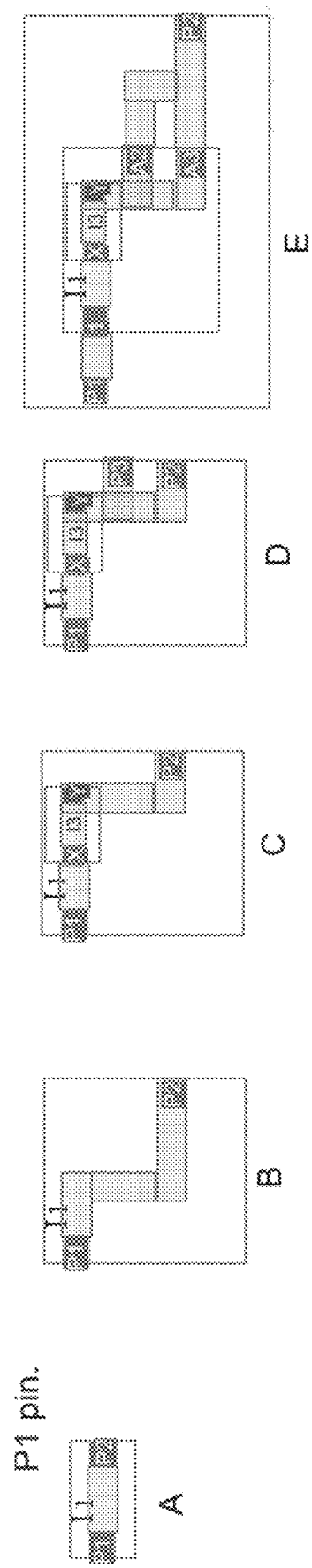

Referring now to FIG. 20, an example showing trace through pin computation using DC path tracing is provided. The general approach for pin to pin tracing is to trace through the DC path across all the pins of an instance. This may include situations where the instance is a leaf level instance (e.g., a metal resistor, etc.) or a hierarchical layout instance. A DC path trace through may occur across the hierarchy of that instance. FIG. 20 shows a few examples where this trace through pin may be computed using DC path tracing. Option D shows an example where multiple DC paths exist for a source pin (e.g., P1 to P2 as well as P1 to P3). In such a situation, these multiple traced pins may become the candidate connection points for the coupling capacitors. Option E shows an example where the instance is hierarchical and DC path tracing returns P2 for the P1 pin.

Accordingly, as shown above, embodiments included herein may address situations where passive devices or sub-cells are part of the EM model. In these cases the process may distinguish whether there is a DC path (=metal connection) from the net through the connecting device/sub-cell to the external port. When a DC path exists it is valid to reconnect the coupling capacitor to this port. The closest valid port may be selected. In cases with no valid port for reconnection (e.g., the net is completely embedded in the EM model) coupling capacitors may be reconnected to ground.

Figure 21:
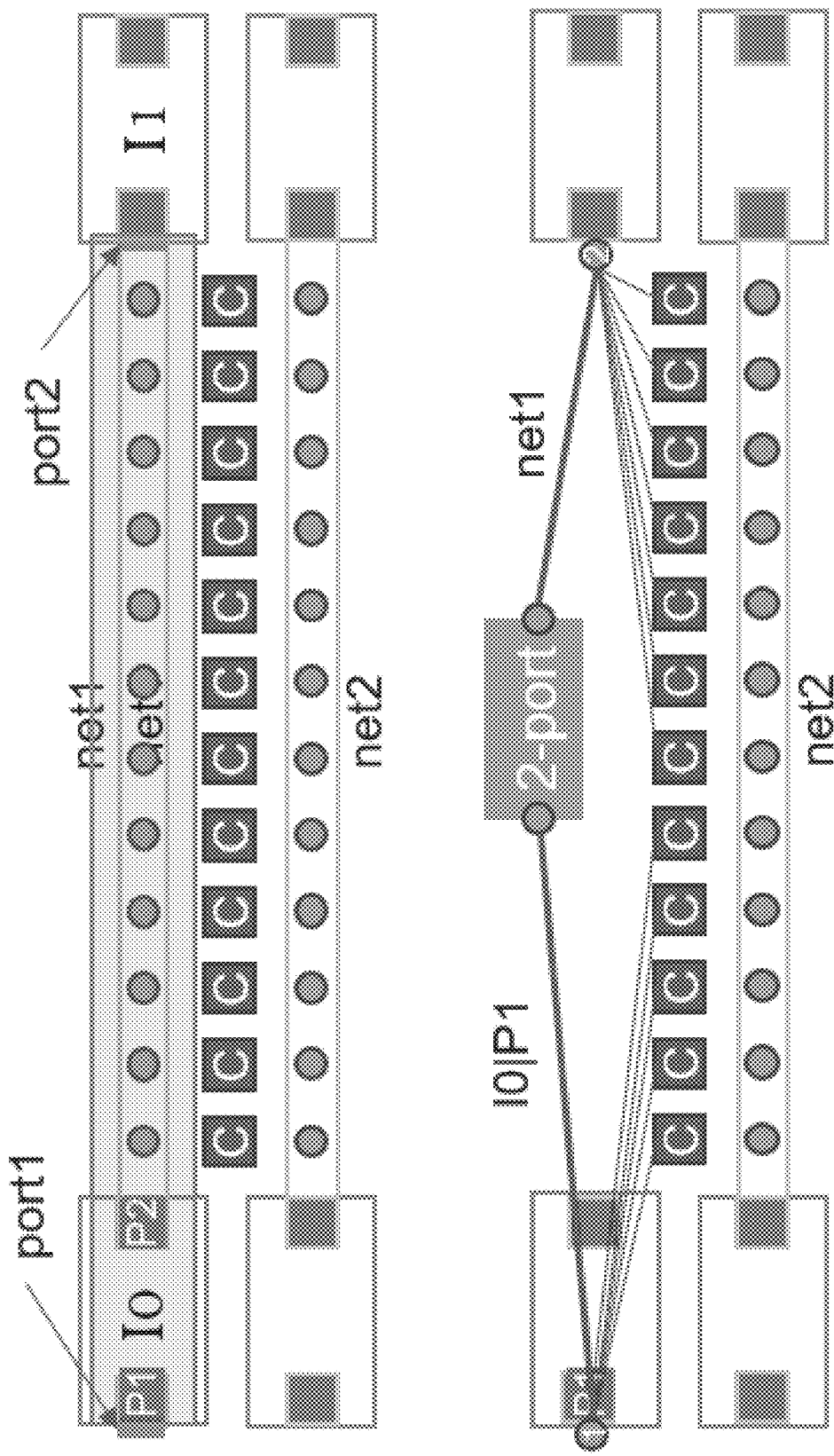
FIGS. 21-22 illustrate examples showing different topologies of an electromagnetic model consistent with embodiments of the present disclosure.
Figure 22:
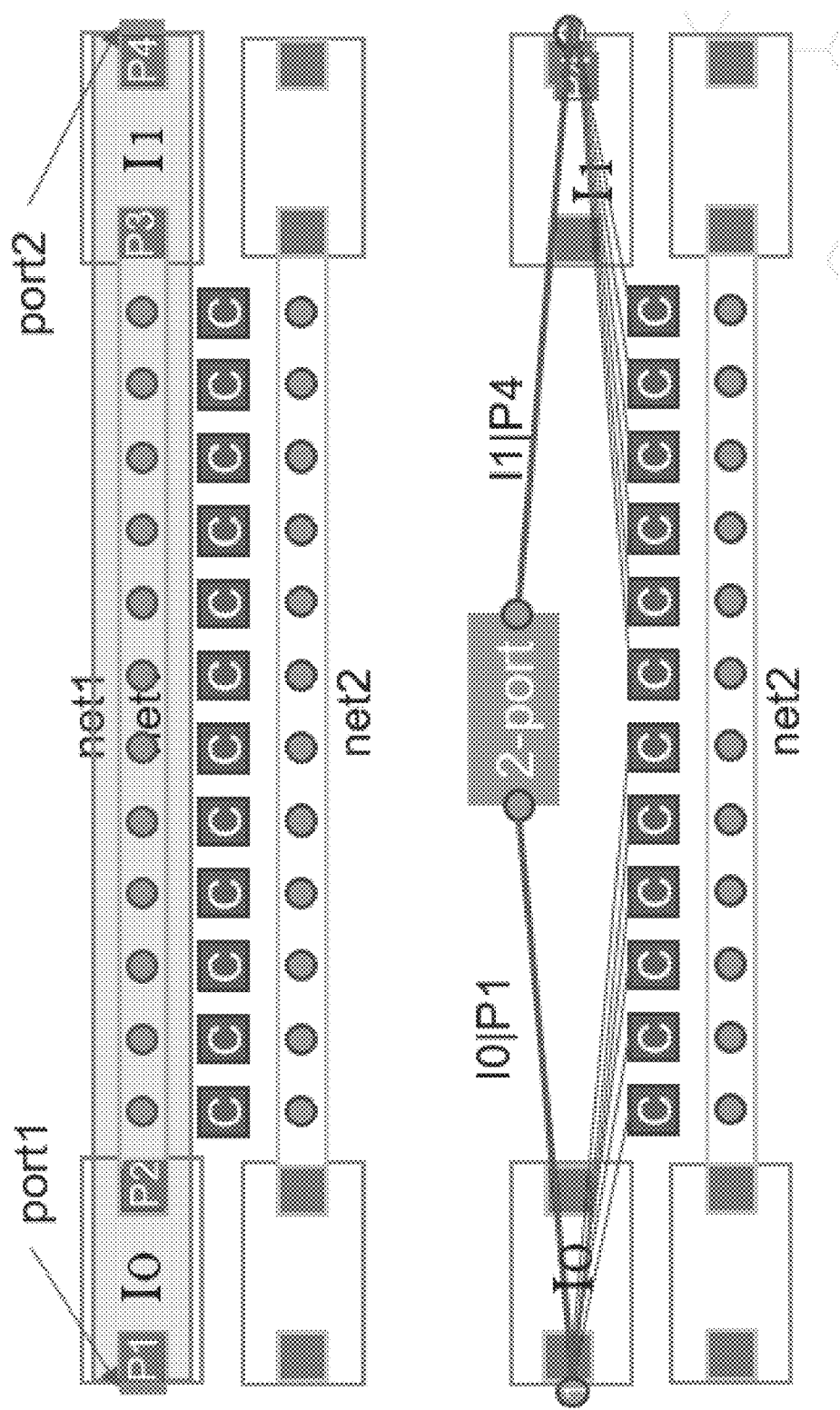

Referring now to FIGS. 21-22, embodiments of the parasitic extraction process showing examples of different topologies of an EM model are provided. This particular example depicts a net having devices or hcells. Here, trace-through cells may correspond to the DC path from an input to an output pin. In the example of FIG. 21, I0 and I1 may be either devices or hcells and there may any number of pins. The EM model here is "net1+I0" and I1 is not part of the EM model. Here, the trace (=dc path) from P1 to P2 inside I0. The process may reconnect the coupling capacitors to the closest port. In the example of FIG. 22, the EM-model is "net1+I0+I1" where net1 is entirely embedded in the EM-model. Here, there are traces from P1 to P2 inside I0 and from P3 to P4 inside I1. The process may then connect coupling caps to the closest port.

In existing systems, there is no ability to define or automatically detect trace-through cells/pins. Capacitances for embedded nets can only be reconnected to ground, which is not particularly accurate. In contrast, embodiments of the present disclosure allow for the definition and automatic detection of trace-through cells. Capacitances for embedded nets that connect to trace-through cells may be reconnected to the closest port, which is a far more accurate solution than prior approaches. Trace-through cells/pins may be defined using any suitable approach. Some of these may include, but are not limited to, using a text file, environmental variable, net tracing (e.g., considering net tracing flow, potential reuse, etc.), DC path information (storing information in the model header), etc.

Figure 23:
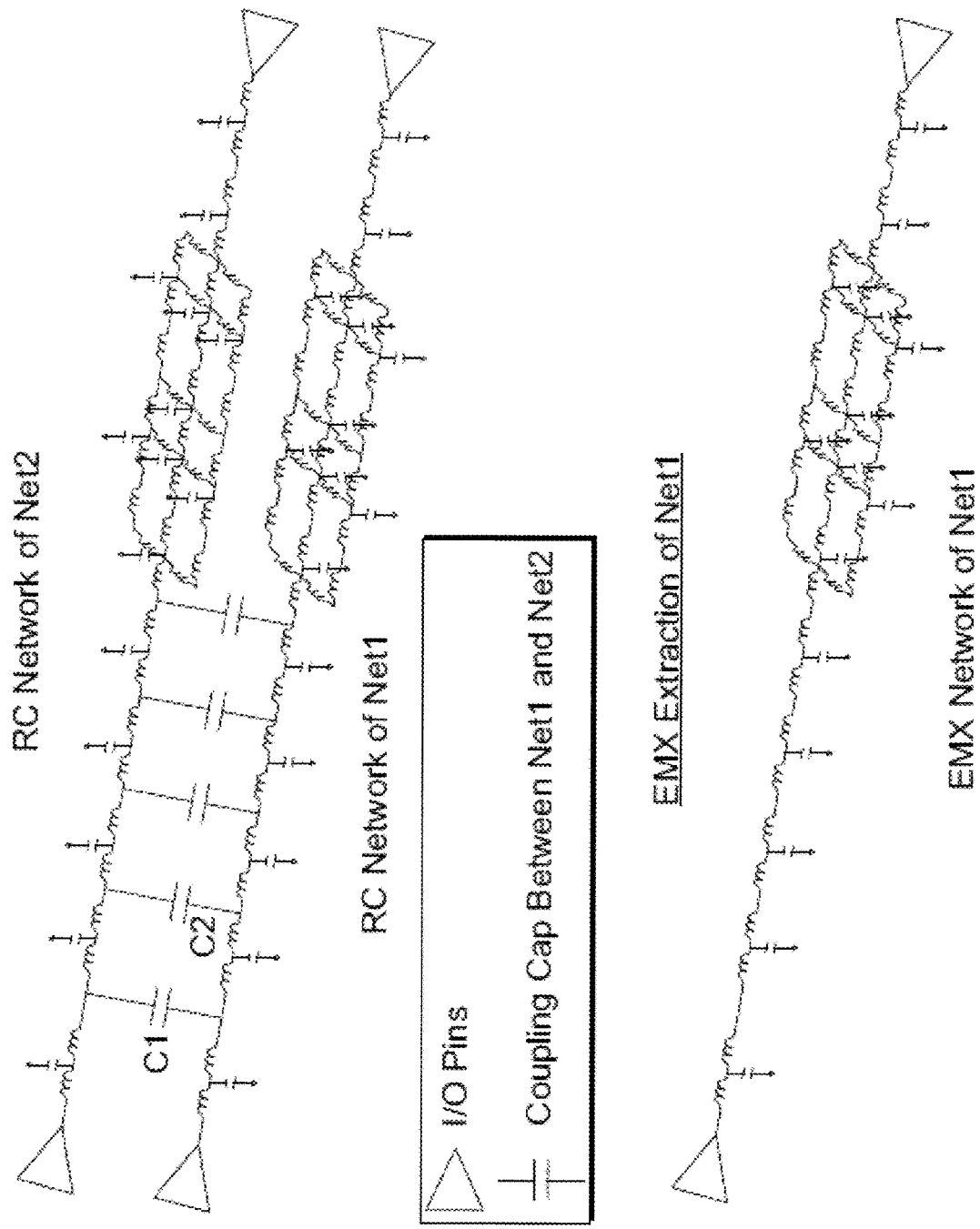
FIGS. 23-24 illustrate examples showing reconnection to various extracted networks consistent with embodiments of the present disclosure.
Figure 24:
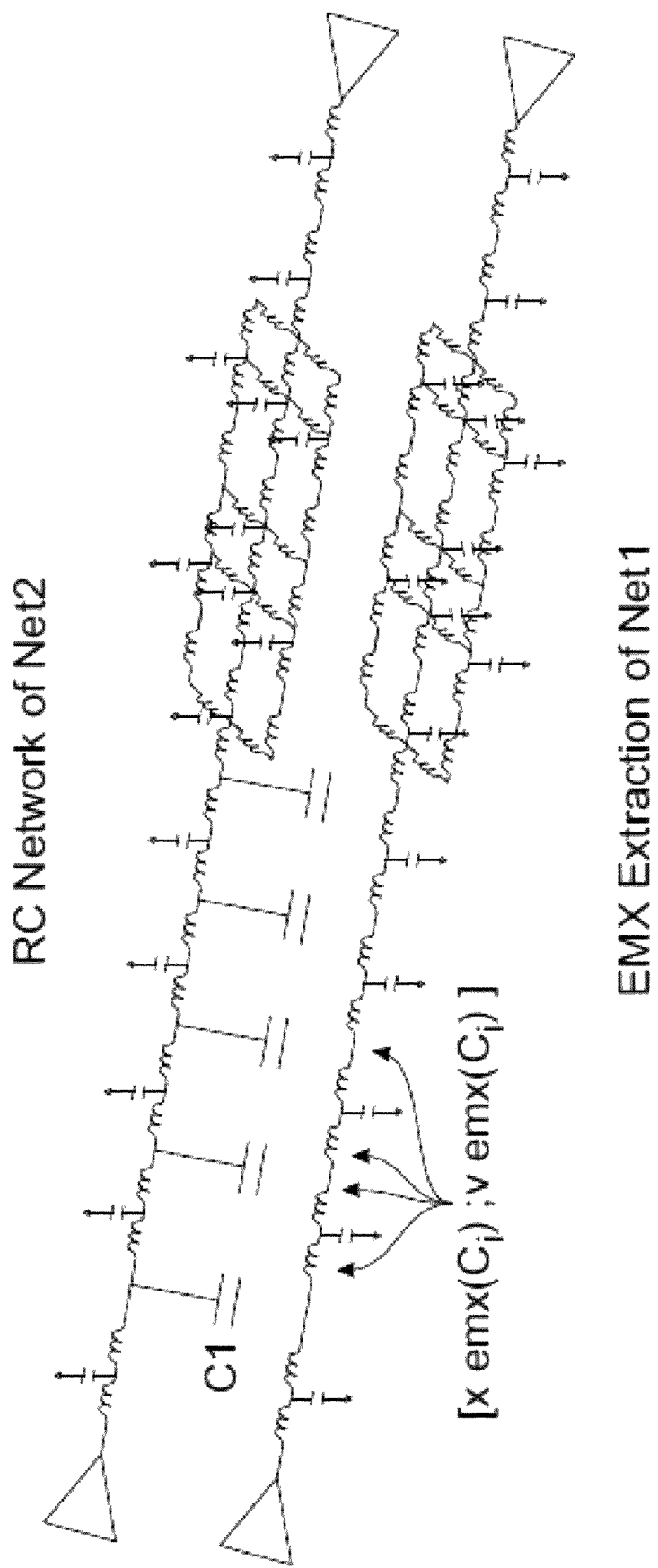

Referring now to FIGS. 23-24, embodiments of the parasitic extraction process showing examples of combining parasitic extraction results from an EM solver analysis to preserve the distributive nature of the physical layout are provided. It is often desirable to mix parasitic extraction and electromagnetic techniques, but to maintain accuracy of the simulation the distributive nature of the physical layout must be preserved when reconnecting the coupling caps. In some embodiments, the parasitic extraction process may utilize a Method of Moments (MoM) approach to segment a layout into mesh elements that derive a circuit representation for each mesh. This approach may better approximate the distributive nature of the problem. This approach may result in a network of lumped circuit representation of the mesh. Prior to solving the network to determine the transfer function of the network the parasitic extraction elements from the parasitic extraction tool may be added to the network. With the MoM network and the parasitic extraction networks combined the distributive nature of the layout may be preserved and the EM solver may be used to determine the combined transfer function. FIG. 23 shows the capacitive coupling between two nets (parasitic extraction tool result shown above) and the EM solver extraction of net1 with the EM solver meshing independent of the parasitic extraction meshing (intermediate EM solver result).

FIG. 24 shows an example for reconnecting to an EM solver network. When solving layout topologies and extracting s-parameters the EM solver may create an internal mesh. This mesh is not accessible to the end user. However, it is possible to provide an application programming interface ("API") for the stitching algorithm allowing for reconnecting the coupling capacitors to the EM solver internal mesh. This approach considers the distributive nature of physical structures and as such is most accurate for high frequency applications. As a final step EM solver may solve the entire RC-network, for example, the parasitic extraction portion as well as the EM solver extracted portion and may return an s-parameter model for the entire passive part of the circuit.

In some embodiments, the parasitic extraction process may be configured to solve for the parasitic extraction of the complete layout. This may include replacing the parasitic extracted RC network of net1 with an EM solver extracted network of net1. The process may include reconnecting to coupling caps C1, C2, . . . to the EM solver extracted network of net1. The reconnection may be based on x, y coordinates.

This process may include:
  obtaining x/y-coordinates for $C_i$ connection to net1 from Quantus run [$x\_qrc(C_i)$; $y\_qrc(C_i)$]
  obtaining x/y-coordinates for all net1-subnodes from EMX run [$x\_emx(C_j)$; $y\_emx(C_j)$]
  reconnecting $C_i$ to EMX-net1 subnode [$x\_emx(C_j)$; $y\_emx(C_j)$] that has the closest distance to [$x\_qrc(C_i)$; $y\_qrc(C_i)$]

In some embodiments, the parasitic extraction process may then solve the complete problem network for s-parameters with the EM solver resulting in a 4-port result rather than a 2-port with lumped capacitive elements from the parasitic extraction. The result of the previous steps is an RC(LK) network that was partially extracted by the parasitic extraction tool and partially extracted by EM solver. The RC(LK) network may connect to active and non-EM devices (e.g., leaf cells). The process may then remove active devices from the netlist and add ports, solve entire RC(LK) network with the EM solver, return s-parameters, reconnect active devices, create a graphical user interface visualization, netlist, etc.

Figure 25:
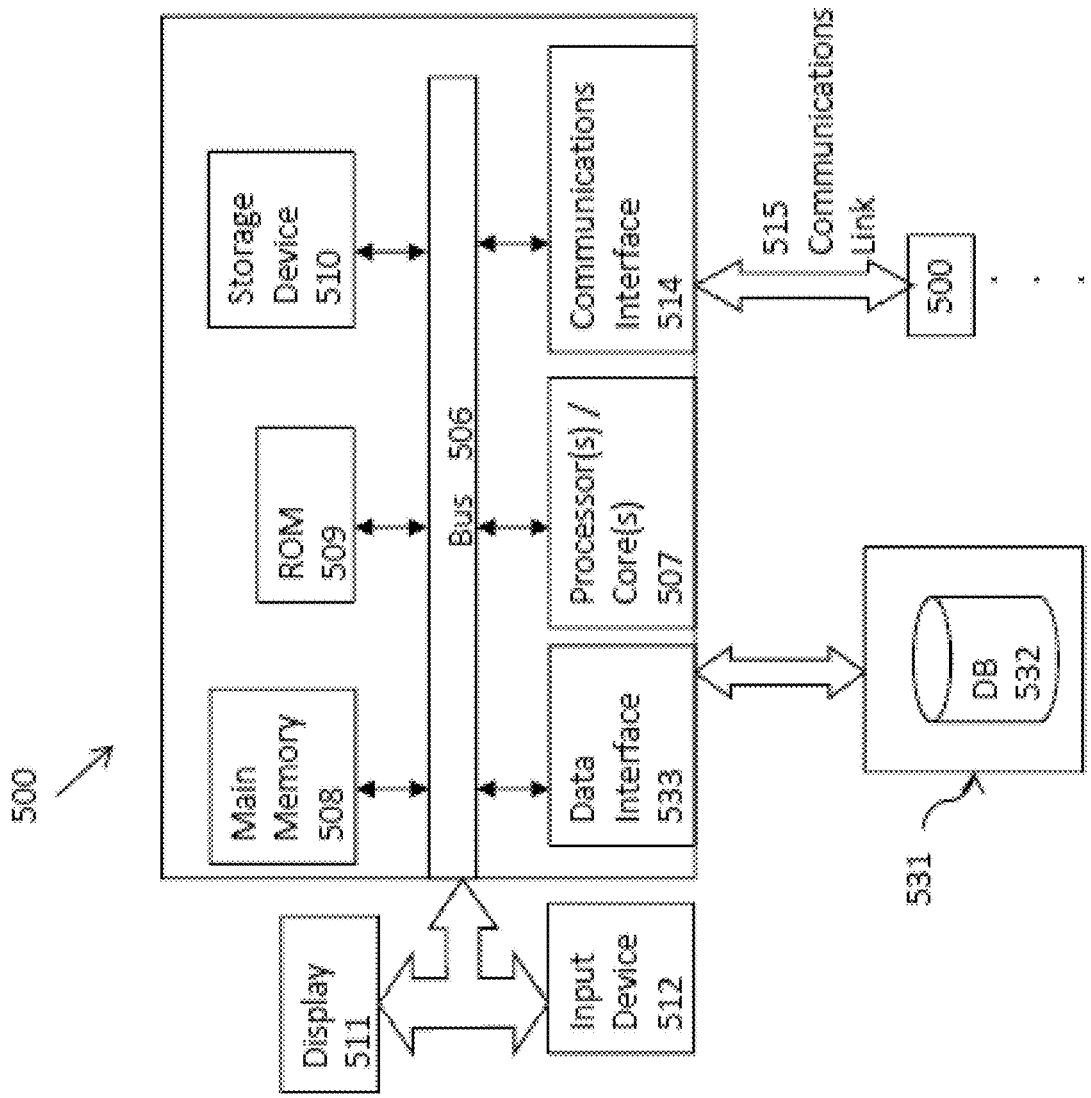
FIG. 25 illustrates a system diagram that may be used to implement one or more embodiments.

FIG. 25 illustrates a block diagram of an illustrative computing system 500 suitable for parasitic extraction as described in the preceding paragraphs with reference to various figures. Computer system 500 includes a bus 506 or other communication mechanism for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control (not shown).

According to one embodiment, computing system 500 performs specific operations by one or more processor or processor cores 507 executing one or more sequences of one or more instructions contained in system memory 508. Such instructions may be read into system memory 508 from another computer readable/usable storage medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 507, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A mechanism described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a mechanism described herein may be implemented as an application-specific integrated circuit (ASIC) in some embodiments.

In these embodiments, a mechanism may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of mechanism. A mechanism described herein or an equivalent thereof may perform its respective functions alone or in conjunction with one or more other mechanisms. A mechanism described herein or an equivalent thereof may thus invoke one or more other mechanisms by, for example, issuing one or more commands or function calls. The invocation of one or more other mechanisms may be fully automated or may involve one or more user inputs.

The term "computer readable storage medium" or "computer usable storage medium" as used herein refers to any non-transitory medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments of the invention, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program, e.g., application code, through communication link 515 and communication interface 514. Received program code may be executed by processor 507 as it is received, and/or stored in disk drive 510, or other non-volatile storage for later execution. In an embodiment, the computing system 500 operates in conjunction with a data storage system 531, e.g., a data storage system 531 that includes a database 532 that is readily accessible by the computing system 500. The computing system 500 communicates with the data storage system 531 through a data interface 533. A data interface 533, which is coupled with the bus 506, transmits and receives electrical, electromagnetic or optical signals that include data streams representing various types of signal information, e.g., instructions, messages and data. In embodiments of the invention, the functions of the data interface 533 may be performed by the communication interface 514. It also should be appreciated that the computer system 500 may be extended to a cloud-based computing system.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer-implemented method for use in an electronic design environment comprising:
   receiving, using at least one processor, an electronic design layout;
   performing parasitic extraction on the electronic design layout;
   extracting an electromagnetic model from the electronic design layout;
   reconnecting at least one coupling capacitor associated with a net of the electromagnetic model;
   performing a simulation including the reconnected at least one coupling capacitor, wherein reconnecting at least one coupling capacitor includes reconnecting to an electromagnetic simulator network prior to solving for one or more s-parameters;
   defining one or more trace through cells, wherein a trace through cell is defined using at least one of a text file, an environmental variable, net tracing, or DC path information;
   automatically detecting the one or more trace through cells; and
   reconnecting a capacitance for one or more embedded nets that connect to the trace through cells.

2. The computer-implemented method of claim 1, wherein reconnecting at least one coupling capacitor includes reconnecting to a ground net.

3. The computer-implemented method of claim 1, wherein reconnecting at least one coupling capacitor includes reconnecting to a closest port of the electromagnetic model.

4. The computer-implemented method of claim 3, wherein reconnecting to the closest port of the electromagnetic model includes pin to pin tracing for instances embedded in the electromagnetic model.

5. The computer-implemented method of claim 1, wherein reconnecting the capacitance occurs at a closest port.

6. A non-transitory computer-readable storage medium having stored thereon instructions that when executed by a machine result in the following operations:
   receiving, using at least one processor, an electronic design layout;
   performing parasitic extraction on the electronic design layout;
   extracting an electromagnetic model from the electronic design layout;
   reconnecting at least one coupling capacitor associated with a net of the electromagnetic model; and
   performing a simulation including the reconnected at least one coupling capacitor, wherein reconnecting at least one coupling capacitor includes reconnecting to an electromagnetic simulator network prior to solving for one or more s-parameters;
   defining one or more trace through cells, wherein a trace through cell is defined using at least one of a text file, an environmental variable, net tracing, or DC path information;
   detecting the one or more trace through cells; and
   reconnecting a capacitance for one or more embedded nets that connect to the trace through cells.

7. The non-transitory computer-readable storage medium of claim 6, wherein reconnecting at least one coupling capacitor includes reconnecting to a ground net.

8. The non-transitory computer-readable storage medium of claim 6, wherein reconnecting at least one coupling capacitor includes reconnecting to a closest port of the electromagnetic model.

9. The non-transitory computer-readable storage medium of claim 8, wherein reconnecting to the closest port of the electromagnetic model includes pin to pin tracing for instances embedded in the electromagnetic model.

10. The non-transitory computer-readable storage medium of claim 6, wherein reconnecting the capacitance occurs at a closest port.

* * * * *